US010418032B1

(12) United States Patent
Mohajer et al.

(10) Patent No.: US 10,418,032 B1
(45) Date of Patent: Sep. 17, 2019

(54) SYSTEM AND METHODS FOR A VIRTUAL ASSISTANT TO MANAGE AND USE CONTEXT IN A NATURAL LANGUAGE DIALOG

(71) Applicant: SoundHound, Inc., Santa Clara, CA (US)

(72) Inventors: Keyvan Mohajer, San Jose, CA (US); Christopher Wilson, Sunnyvale, CA (US); Bernard Mont-Reynaud, Sunnyvale, CA (US); Regina Collecchia, Santa Clara, CA (US)

(73) Assignee: Soundhound, Inc., Santa Clara, CA (US)

( * ) Notice: Subject to any disclaimer, the term of this patent is extended or adjusted under 35 U.S.C. 154(b) by 0 days.

(21) Appl. No.: 15/163,485

(22) Filed: May 24, 2016

Related U.S. Application Data

(63) Continuation of application No. 15/094,937, filed on Apr. 8, 2016, now abandoned.
(Continued)

(51) Int. Cl.
*G10L 15/22* (2006.01)
*G06F 17/30* (2006.01)
(Continued)

(52) U.S. Cl.
CPC ........ *G10L 15/22* (2013.01); *G06F 16/24522* (2019.01); *G06F 16/258* (2019.01); *G10L 15/19* (2013.01)

(58) Field of Classification Search
CPC .... G10L 15/1815; G10L 15/22; G06F 17/279
See application file for complete search history.

(56) References Cited

U.S. PATENT DOCUMENTS 5,685,000 A * 11/1997 Cox, Jr. .................. G10L 15/22
379/68
6,377,913 B1 * 4/2002 Coffman .................. G06F 3/16
704/2
(Continued)

OTHER PUBLICATIONS

Dr. Dobb's, "Measuring API Usability", retrieved from http://www.drdobbs.com/windows/measuring-api-usability/184405654, May 1, 2004.*
(Continued)

*Primary Examiner* — Brian L Albertalli
(74) *Attorney, Agent, or Firm* — Haynes Beffel & Wolfeld LLP; Ernest J. Beffel, Jr.; Andrew L. Dunlap

(57) ABSTRACT

A dialog with a conversational virtual assistant includes a sequence of user queries and systems responses. Queries are received and interpreted by a natural language understanding system. Dialog context information gathered from user queries and system responses is stored in a layered context data structure. Incomplete queries, which do not have sufficient information to result in an actionable interpretation, become actionable with use of context data. The system recognizes the need to access context data, and retrieves from context layers information required to transform the query into an executable one. The system may then act on the query and provide an appropriate response to the user. Context data buffers forget information, perhaps selectively, with the passage of time, and after a sufficient number and type of intervening queries.

12 Claims, 20 Drawing Sheets

Related U.S. Application Data

(60) Provisional application No. 62/146,176, filed on Apr. 10, 2015.

(51) Int. Cl.
    *G10L 15/19*      (2013.01)
    *G06F 16/25*      (2019.01)
    *G06F 16/2452*    (2019.01)

(56) References Cited

U.S. PATENT DOCUMENTS

| | | |
|---|---|---|
| 8,577,671 B1 | 11/2013 | Barve et al. |
| 8,606,568 B1 | 12/2013 | Tickner et al. |
| 8,706,503 B2 | 4/2014 | Cheyer et al. |
| 9,772,994 B2* | 9/2017 | Karov ............... G06F 17/2785 |
| 2002/0038213 A1* | 3/2002 | Adachi ............... G06F 17/271 704/257 |
| 2002/0133355 A1* | 9/2002 | Ross ............... G10L 15/1822 704/275 |
| 2002/0135618 A1* | 9/2002 | Maes ............... G06F 3/0481 715/767 |
| 2008/0201135 A1* | 8/2008 | Yano ............... G10L 15/1822 704/201 |
| 2009/0055165 A1* | 2/2009 | Jindal ............... G06F 17/2881 704/9 |
| 2009/0150156 A1* | 6/2009 | Kennewick ........ G06Q 30/0261 704/257 |
| 2010/0267345 A1* | 10/2010 | Berton ............... G10L 15/22 455/68 |
| 2011/0119047 A1* | 5/2011 | Ylonen ............... G06F 17/2785 704/9 |
| 2012/0016678 A1 | 1/2012 | Gruber et al. |
| 2012/0290298 A1* | 11/2012 | Ljolje ............... G10L 15/197 704/235 |
| 2014/0040748 A1* | 2/2014 | Lemay ............... G06F 3/167 715/728 |
| 2014/0309990 A1* | 10/2014 | Gandrabur ........ G10L 15/1815 704/9 |
| 2015/0142704 A1* | 5/2015 | London ............... G06N 5/04 706/11 |
| 2015/0340033 A1* | 11/2015 | Di Fabbrizio ........ G10L 15/18 704/254 |
| 2016/0188565 A1* | 6/2016 | Robichaud ........ G06F 17/278 704/9 |
| 2017/0110127 A1* | 4/2017 | Fujii ............... G10L 15/22 |

OTHER PUBLICATIONS

Jurafsky and Martin, Speech and Language Processing 2nd Ed, Chapter 21, section 21.7 to 21.9 (2009).

* cited by examiner

User: What is the mortgage on a million dollar house?

Agent: *What is the down payment?*

User: One hundred thousand dollars

Agent: *Ok. What is the interest rate?*

User: Four percent

Agent: *Ok. what is the mortgage period?*

User: Thirty years

Agent: *The monthly mortgage payment on a one million dollar house with one hundred thousand dollars down at four percent interest over thirty years is four thousand two hundred ninety-six dollars and seventy-four cents.*

FIG. 1

User: Call John's cell phone.

Agent: *Should I call John Smith?*

User: No, John Stuart

Agent: *Ok.* [A call is placed to John Stuart's cell phone]

FIG. 2

User: What is John Stuart's birthday?

Agent: *August 16*

User: Call John's cell.

Agent: *Ok.* [A call is placed to John Stuart's cell phone]

FIG. 3

| QUERY ENTITIES |
|---|
| WHO: <a Person> |
| WHAT: <an Entity> |
| WHEN: <a DateTime> |
| WHERE: <a Place> |
| QUANTITY: <an Amount> |

| RESPONSE ENTITIES |
|---|
| WHO: <a Person> |
| WHAT: <an Entity> |
| WHEN: <a DateTime> |
| WHERE: <a Place> |
| QUANTITY: <an Amount> |

(a)

| QUERY ENTITIES | VALUE WEIGHTS |
|---|---|
| WHO | WHO_WEIGHT |
| WHAT | WHAT_WEIGHT |
| WHEN | WHEN_WEIGHT |
| WHERE | WHERE_WEIGHT |
| QUANTITY | QUANTITY_WEIGHT |

| RESPONSE ENTITIES | VALUE WEIGHTS |
|---|---|
| WHO | WHO_WEIGHT |
| WHAT | WHAT_WEIGHT |
| WHEN | WHEN_WEIGHT |
| WHERE | WHERE_WEIGHT |
| QUANTITY | QUANTITY_WEIGHT |

| Query | query interpretation | completed interpretation | Response |
|---|---|---|---|
| "What is the population of Japan?" | INTENT: GEO_QUIZ<br><br>WHERE: JAPAN<br><br>WHAT: POPULATION | INTENT: GEO_QUIZ<br><br>WHERE: JAPAN<br><br>WHAT: POPULATION | "One hundred twenty-eight million." |
| "How about China?" | WHERE: CHINA | INTENT: GEO_QUIZ<br><br>WHERE: CHINA<br><br>WHAT: POPULATION | "One billion, four hundred million." |

FIG. 15

| Query | query interpretation | completed interpretation | Response |
|---|---|---|---|
| "Show me hotels in Alexandria Virginia." | INTENT: HOTEL_SEARCH<br><br>WHERE: ALEXANDRIA VIRGINIA<br><br>WHEN: ?<br><br>FILTER: NONE | INTENT: HOTEL_SEARCH<br><br>WHERE: ALEXANDRIA VIRGINIA<br><br>WHEN: ?<br><br>FILTER: NONE | "... Hyatt Regency...<br><br>Hilton...<br><br>Always-full Suites...<br><br>Bed Bug Inn...<br><br>Marriott..." |
| "What is the weather like there Sunday?" | INTENT: WEATHER_INFO<br><br>WHERE: ?<br><br>WHEN: SUNDAY | INTENT: WEATHER_INFO<br><br>WHERE: ALEXANDRIA VIRGINIA<br><br>WHEN: SUNDAY | "... sunny with a high temperature of ninety degrees..." |
| "Show me ones with air conditioning." | INTENT: HOTEL_SEARCH<br><br>WHERE: ?<br><br>WHEN: ?<br><br>FILTER: AIR COND | INTENT: HOTEL_SEARCH<br><br>WHERE: ALEXANDRIA VIRGINIA<br><br>WHEN: SUNDAY<br><br>FILTER: AIR COND | "... Hyatt Regency...<br><br>Hilton...<br><br>Marriott..." |

FIG. 16

| Query | query interpretation | completed interpretation | Response |
|---|---|---|---|
| *"Take the sum of two and thirteen."* | INTENT: MATH<br><br>QUANTITY 1: 2<br><br>QUANTITY 2: 13<br><br>OPERATION: ADD | INTENT: MATH<br><br>QUANTITY 1: 2<br><br>QUANTITY 2: 13<br><br>OPERATION: ADD | *"Fifteen"* |
| *"What about their product?"* | INTENT: MATH<br><br>QUANTITY 1: ?<br><br>QUANTITY 2: ?<br><br>OPERATION: MULTIPLY | INTENT: MATH<br><br>QUANTITY 1: 2<br><br>QUANTITY 2: 13<br><br>OPERATION: MULTIPLY | *"Twenty-six"* |
| *"Now subtract five."* | INTENT: MATH<br><br>QUANTITY 1: ?<br><br>QUANTITY 2: 5<br><br>OPERATION: SUBTRACT | INTENT: MATH<br><br>QUANTITY 1: 26<br><br>QUANTITY 2: 5<br><br>OPERATION: SUBTRACT | *"twenty-one"* |

FIG. 17

SYSTEM AND METHODS FOR A VIRTUAL ASSISTANT TO MANAGE AND USE CONTEXT IN A NATURAL LANGUAGE DIALOG

CROSS REFERENCE

This non-provisional application is a continuation of U.S. application Ser. No. 15/094,937, entitled "System and Methods for a Virtual Assistant to Share Conversation Context with Vertical Applications", filed Apr. 8, 2016 and naming inventors Keyvan Mohajer, Christopher Wilson, Bernard Mont-Reynaud, and Regina Collecchia; which claims priority to U.S. Provisional Application No. 62/146,176, entitled "System and Methods for a Virtual Assistant to Share Conversation Context with Vertical Applications", filed Apr. 10, 2015 and naming inventors Keyvan Mohajer, Christopher Wilson, Bernard Mont-Reynaud, and Regina Collecchia. Both of these related applications are incorporated by reference herein.

FIELD OF THE INVENTION

The present invention relates to natural language understanding systems, and in particular, to supporting the conversational capabilities of a virtual assistant.

BACKGROUND

Speech recognition and natural language understanding capabilities of mobile devices have grown rapidly in recent years. Automatic Speech Recognition (ASR) and Natural Language Processing (NLP) allow users of electronic devices to interact with computer systems using a subset of natural language, in spoken or written form. Users interact with a virtual assistant and present queries that typically ask for information or request an action. The queries are processed by an automated agent that attempts to recognize the structure and meaning of the user's query, and when successful, to create a response and to present it to the user. The term assistant is anthropomorphic: it refers to a human-like interface that receives user queries and responds in terms that users understand; the term agent refers instead to the computer-based implementation of the functionality that the assistant presents to users. These two terms are closely related, and they are often used interchangeably.

Various approaches to the understanding of natural language input are known in the art. One of them is called syntax-based semantics. This approach starts with the use of a context-free grammar (CfG) to recognize syntactically well-formed natural language sentences while excluding ill-formed ones. Context-free grammars are well known in the art. A CfG comprises an alphabet, that consists of terminal and non-terminal symbols, and a set of production rules. Every rule has a left-hand side, which is a non-terminal symbol, and a right-hand side, which is a sequence of terminal and non-terminal symbols. Analyzing the syntactic structure of a sentence (according to a grammar) is called parsing; numerous parsing techniques are known in the art. Many classic texts discuss CfG's and their properties. In this disclosure, the right-hand side of a production rule is called a grammar pattern.

Context-free grammars focus on syntax, but they ignore semantics. A sentence can be valid according to grammar, yet meaningless. The sample sentence 'green ideas sleep furiously' derives from '<Adjective><Noun><Verb><Adverb>' and is syntactically correct, but it violates multiple semantic constraints. Semantic constraints can be added to a context-free grammar by associating with every production rule a procedure called a semantic augment; this procedure is designed to fail when semantic constraints are violated, but it does more. The main purpose of a rule's semantic augment is to build an interpretation (a semantic representation) for an expression correctly recognized by the rule's pattern. In a syntax-based approach to semantics, the principle of compositionality states that the interpretation of the whole is obtained by combining the interpretations of the parts. In syntactic analysis, a constituent is defined as a word or group of words that function(s) as a single unit within a hierarchical structure (e.g., a context-free grammar). Constituents occur naturally in NLU systems; they have interpretations, just like queries, which are data structures that encode their meaning. In some embodiments, they have semantic types, or belong in a hierarchy of semantic types, or ontology. For example, 'John's address' and 'my uncle's birthplace' are constituents of semantic type Address, a sub-type of Location. The interpretation of a constituent, just like that of an entire query, is the internal data structure that represents (encodes) the intuitive meaning of the constituent that it represents. This data structure is the output of parsing and interpretation processes, which attempt to formally capture the actionable meaning of the constituent.

The approach broadly described above is called syntax-based semantics. At every step of application of a production rule, a rule-specific procedure is invoked, which applies semantic constraints, and (if the constraints are met) to create an interpretation of the entire pattern instance from the interpretations of the individual pattern element instances. The repeated use of such bottom-up combination procedures, 'all the way up' to the entire sentence, creates an interpretation of the input by mapping it to an internal data structure, which represents the input's meaning. Note, however, that the parsing and interpretation process does not guarantee a unique result; in general, a given natural language input may have multiple interpretations. The result of parsing and interpretation is, in a way, not much more than a restatement of the natural language input, but a valid input sentence is mapped to one or more internal representations suitable for further processing.

The syntax-based semantics approach is only one of several approaches known in the field. Alternative ways to approach the analysis and interpretation of natural language input include Parts-Of-Speech, pattern matching and statistical approaches, neural networks, and more techniques. A semantic parser, based on a semantic grammar, is able to reject a syntactically ill-formed input query; reject a meaningless query; recognize the structure of a well-formed, meaningful query; and in the process of recognition, to create the query's interpretation. The output of a semantic parser, or interpretation, is always a data structure built as an internal representation of a query's meaning.

Many ways have been used to represent knowledge and the associated data structures. The variables in a frame are arbitrary symbols (names) and usually have a type, such as an integer, string, an array of elements of a given type, or a pointer to, e.g., another frame of a given type. The variables in a frame are also called slots, and the terms variable and slot are used interchangeably. The type of a frame specifies the set of possible slots and their types. Often, a slot represents a role that a constituent plays. Examples of slots that are roles occur in a pattern such as 'WHO did WHAT to WHOM, WHEN, WHERE and WHY?' where an Actor, an Action, a Recipient, a Time, a Location and a Reason may be recognized. Slots may be optional, that is, a frame instance may provide no value for a specific slot. Some slot values may be obligatory.

For a simple example of a frame definition, a Murder frame could have slots for Victim, Weapon, Place, Date and Time, and Suspects (an array, or as multiple Suspect slots) and some additional slots. The Victim slot is required for the Murder frame (expressing that there is no murder without a victim).

When attempting to understand queries, additional steps are often needed after the parsing and interpretation of a query, and before its execution. One such step has been so identified as the co-reference resolution problem, which is generally concerned with finding that (say) a reference to a person ('Mr. Smith') points to the same entity as another ('the man with the felt hat'). A number of approaches to co-reference resolution have been suggested in the literature in computational linguistics and discourse analysis. See Jurafsky and Martin, Speech and Language Processing 2nd Ed, Chapter 21, section 21.7 to 21.9 (2009).

Other issues may have to be addressed to develop a precise representation of the meaning of a sentence, sufficient to act on it. The steps that follow the parsing and interpretation of a sentence may involve deduction, common sense reasoning, world knowledge, pragmatics and more. The scope and complexity of such additional steps is quite variable from one system to another.

Today's virtual assistants, if they have conversational capabilities at all, are quite limited in their ability to handle conversation in a human-like manner. A new approach is needed to build a system for supporting virtual assistants that can understand conversation across multiple vertical domains of subject matter. Building such a system should not require natural language application developers to acquire an extensive training in linguistics or artificial intelligence; and they should be applicable to systems with very large numbers of users and very large number of domains.

SUMMARY OF THE INVENTION

The present invention is directed to systems and methods to extract, store, and retrieve dialog context information relevant to creating intelligent dialog in a conversational assistant. Particular embodiments of the present invention are portable across domains, and do not require natural language application developers to acquire a deep training in linguistics or an extensive background in artificial intelligence.

Virtual assistants according to embodiments of the invention give users a better experience by supporting natural communication during a dialog with a user. A conversational assistant according with the invention remembers relevant information from recent dialog exchanges, accesses it, and uses it appropriately. Some embodiments of the present invention provide natural language application developers with a framework for handling conversation context. Such a framework has a data structure (called the dialog history) that keeps track of relevant context information and updates it as the dialog progresses. Conversational virtual assistants access a dialog history selectively to retrieve context information from recent queries.

Previous attempts to build effective conversational assistants have faced many challenges. In some ways, the problem may be viewed as an underspecified problem of storage and retrieval, informed by an understanding of natural language human dialog. It is easy to imagine an agent that remembers everything that was said in a dialog, but this potentially runs into both storage limitation issues and computational issues in the retrieval phase—the search for context information most relevant to a new query. In the contemplated applications, systems may have tens or hundreds of thousands of users, and ideally will respond in real-time. It is thus desirable, not only to limit the amount of context information remembered, but to structure it appropriately for effective retrieval. Other aspects of the problem include recognizing a specific query's need for a certain type of context information, to direct precise retrieval, and to apply the retrieved context information correctly. All of the above problems also need to be addressed in the course of a conversation that spans multiple domains of discourse, carrying information over at boundaries when appropriate. These are not trivial tasks, but solving these problems greatly improves the quality of user experience with automated agents.

According to an embodiment of the invention, dialog history comprises mainly a sequence of context layers arranged in time order. Each layer provides a mapping from named slot variables to their values. As a conversation advances, the oldest layers in a dialog history may be 'forgotten.' A set of function calls serves to build and maintain the dialog history, and to retrieve data from it.

The present invention is broadly applicable to virtual conversational assistants, regardless of the application domain. During a single dialog, the approach can operate across multiple domains of discourse, where there is shared information. In other words, the context created by one or more previous queries can usefully affect a subsequent query, even if the various queries are not in the same domain.

BRIEF DESCRIPTION OF THE DRAWINGS

FIG. 1 shows a dialog between a user and agent according to an embodiment of the invention.

FIG. 2 shows a dialog between a user and agent according to an embodiment of the invention.

FIG. 3 shows a dialog between a user and agent according to an embodiment of the invention.

FIG. 5 shows the entities in a dialog layer, with unweighted or with weighted slots, according to various embodiments of the invention.

FIG. 15 shows the completion of an interpretation during a sequence of queries according to an embodiment of the invention.

FIG. 16 shows the completion of an interpretation during a sequence of queries according to an embodiment of the invention.

FIG. 17 shows the completion of an interpretation during a sequence of queries according to an embodiment of the invention.

DETAILED DESCRIPTION

Figure 4:
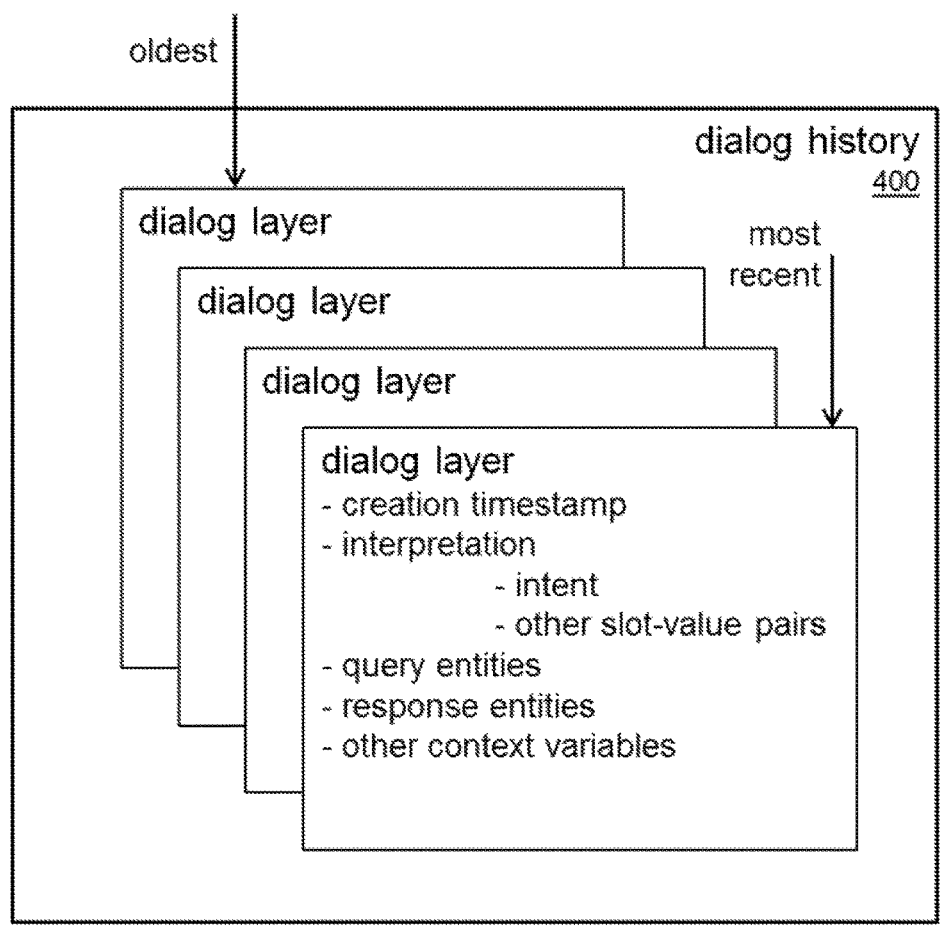
FIG. 4 shows a data structure representing a dialog history according to an embodiment of the invention.

In this disclosure, a dialog or conversation is a sequence of alternating turns, where each turn is an act of communication between a human and a virtual assistant. The terms conversation and dialog are used interchangeably. During their turn, users input into the virtual assistant a spoken or written query. The assistant then takes a turn to return a response; the system's response to the user may be a combination of verbal, written, or audio-visual output.

The terms input and query are also used interchangeably to refer to a contiguous segment of speech or text, which constitutes a turn in the dialog. In some embodiments, the beginning or end of a user's input are explicitly signaled by the user by pressing or releasing a dedicated button, or by typing special characters. In some embodiments, the beginning and end of a turn are automatically chosen by the system. For example, the agent may detect an onset in the input audio stream, using a Voice Activity Detector to start the user's turn, and it may respond to a sufficiently long pause or recognition of a known speech intonation pattern, such as the rising pitch pattern for a question.

The terms semantic grammar and semantic parser are used herein broadly, as follows. In addition to the specific embodiment using augmented grammars and syntax-based semantics, they will also cover alternative embodiments of similar scope and purpose. In the generalized form, a semantic grammar comprises a collection of syntactic rules (or patterns) and associated semantic rules (interpretation patterns), which, when used in combination, control and enable the functionality of a semantic parser.

Frames are used herein as an exemplary method for representing interpretations; it is understood that alternative representations such as triples or First-Order Logic could have been used instead, with essentially equivalent behavior. Frames themselves (their instances and their types) are associative maps that may be represented in a number of ways, including property lists, hash maps, and other concrete data structures.

In an example embodiment, the query 'Text 650-123-4567 Mom sorry I am late for dinner' may be interpreted using a frame such as: [@intent=SEND_SMS; @recipient=PHONE_NO('650-123-4567'); @message='Mom sorry I am late for dinner'] where the expression PHONE_NO('650-123-4567') is in fact the printed form of a sub-frame with its own structure. This is just one of many possible notations for a frame. In this disclosure, frames will be used as internal data structures to represent the interpretation of constituents as well as entire queries, as well the responses to queries, and examples will be illustrated using graphical or serial representations of slot-value pairs. It is understood that the choice of frame data structures and corresponding graphical representations are purely illustrative. A person in the art will easily be able to choose alternative ways to implement the methods described in this disclosure.

Virtual assistants may give human users the initiative that is, the power to establish the subject domain or content of the dialog turn. A user enters a query, and then waits for a response. In simple cases, the assistant responds immediately by answering an information request, by acting upon an action request, or a combination.

In another example situation, assistants according to an embodiment of the invention answer user queries with a question of its own, taking back the initiative. This results in a passive turn for the user, one that is devoted to answering the question from the assistant. A dialog that alternates between active and passive turns is called a mixed-initiative dialog. When an assistant has taken the initiative (i.e., takes control of the dialog), the dialog is said to be modal.

A modal dialog is useful when the assistant is unable to answer a query, due to lack of information in the query—something that is called an incomplete query in this disclosure. In some embodiments, a virtual assistant asks the user to explicitly fill in the information required to complete the query's meaning. A query and its interpretation are called complete if they have sufficient information to be acted upon. A sample dialog from the mortgage calculation domain is found in FIG. 1. Every dialog turn, whether from the user or the agent, is shown on its own line. The dialog starts with an active turn in which the user asks a question. The agent replies, not with an answer but with a question, taking the initiative of the dialog. This starts the modal part of the dialog, which is shown as indented. During a modal dialog, the agent asks questions and the user answers; this happens while information is being gathered to answer the question. The agent answers the original mortgage question after sufficient information was given to determine an actual mortgage value.

According to one embodiment, in spite of the fact the dialog from FIG. 1 has four user turns and four agent turns, only one dialog layer is associated with the sequence. The full sequence is treated as a single context unit from the original query to the final answer; the idea is to 'hide' the modal dialog within the same layer. In this embodiment, the dialog layer is memorized as if the user had asked the complete query 'What is the mortgage on a one million dollar house with one hundred thousand dollars down at four percent interest over thirty years?' In an embodiment, modal dialogs are treated in such a way that they 'hide' at a lower level in the dialog history sequence, as suggested by the indentation of the figures; a single interpretation may then be refined step by step during the modal dialog. There are alternative embodiments of modal dialogs, in which the implied hierarchical structure is handled differently.

A related use of a modal dialog is for disambiguation. FIG. 2 is an example from the communications domain. Assume that John Smith and John Stuart are both found in the user's address book. When the user asks the assistant to 'call John's cell phone' in the first turn, context does not indicate which one is intended; hence there is ambiguity. In this embodiment, the assistant chooses as a dialog strategy to venture a guess, and give the user the opportunity to correct it. In the modal dialog show, the user does make a correction and settles the ambiguity.

The disambiguation, or better, completion of incomplete queries does not always require a modal dialog. In many cases, context from the preceding dialog supplies the missing information, without a need to prompt the user. FIG. 3 shows an example that does not require a modal dialog to disambiguate the second query from the user. The context suggests that 'John' refers to 'John Stuart,' and the meaning of 'Call John's cell' becomes clear and actionable (that is, complete).

As another example, the isolated query 'and with $200,000 down' is meaningless. However, this query is issued right after the dialog of FIG. 1, the dialog context allows the assistant to respond as if the user had uttered the complete query, 'What is the mortgage on a one million dollar house with two hundred thousand dollars down at four percent interest over thirty years?' This query has a definite answer. A virtual assistant that imitates people's handling of context should be able to answer, too. Following up with a query like 'and at three point seven five percent?' is similarly interpreted as 'What is the mortgage on a one million dollar house with two hundred thousand dollars down at three point seven five percent interest over thirty years?' and answered accordingly.

In these examples, context information from the recent dialog provides the data needed to interpret an underspecified query from the user. The context data allows the determination of a specific meaning—an unambiguous interpretation that allows the system to form a response.

Recall that a semantic parser parses and interprets a query, according to a given semantic grammar. The semantic parser serves the function of a 'plain' (non-semantic) parser, which is to check the syntactic structure of the query: the word sequence must be valid according to a 'plain' (un-augmented) grammar. A second function is to extract the meaning (or interpretation) of the query. The terms meaning and interpretation are technically equivalent in this disclosure. They both refer to an internal data structure that a semantic parser creates as the encoding of a user's query as an internal form suitable for further processing. Parsing uses both syntactic and semantic constraints to decide if a query is recognized as valid. A query fails to be recognized if the sequence of words is rejected by the syntax. For example, 'what is the weather in Chicago' is recognized by some embodiments of the invention, but the parser will (or should) reject 'weather what is Chicago' due to syntax. Syntactically correct queries can fail on semantic grounds. For example, 'what time is my first appointment on February 29' is syntactically correct, but not semantically correct—except on leap years; the date expression 'February 29' has to be syntactically correct, since this is a valid word sequence for a date on a leap year; yet, it is incorrect in a non-leap year. In a typical embodiment, calendar knowledge about leap years is part of calendar semantics, not date syntax. According to an embodiment, a query that fails during semantic parsing has no interpretation. In another embodiment, the absence of a valid interpretation may be handled, data structure-wise, by the use of a special value, such as a NULL pointer, or another convention. In yet another embodiment, a syntactically valid but semantically invalid query may have a special error interpretation whose purpose is to give the user an error message, or more interestingly, to ask for a clarification, e.g., 'There is no February 29 this year, do you mean March 1?'

For simplicity in this disclosure, all error interpretations such as described above will be ignored. In other words, queries that fail to have an interpretation that meets all syntactic and semantic constraints have no interpretation. On the other hand, queries that only fail to meet completeness constraints will be treated as valid, and will be given incomplete interpretations.

When the parsing and interpretation of a query succeeds, it may succeed in more than one way. An ambiguous query has more than one interpretation; the ambiguity may be due to more than one valid parse. For example, in the absence of strict precedence rules, which may be rather unintuitive, a natural language arithmetic expression such as 'square root of nine plus sixteen' may be parsed and interpreted either as (sqrt(9)+16) or as sqrt(9+16), where sqrt(x) denotes the square root of x. Ambiguities may also be due to other factors, such as may arise during execution. In many domains, ambiguous queries are difficult to avoid without undue restrictions on the freedom of expression of users. Accordingly, some embodiments of a semantic parser support the handling of multiple interpretations of an expression, or an entire query, as often as is appropriate. Alternative interpretations of a query are treated as hypotheses, and a natural language understanding (NLU) system will have to make a choice among alternatives. In some embodiments, a likelihood score is associated with every interpretation, and the NLU system may select among alternative interpretations the one with the highest likelihood score.

Each user request has an overall purpose called the user intent, such as placing a phone call, searching for a restaurant, or reserving a flight. In a frame representation, the user intent determines a frame type used for the interpretation of the query, which in turn specifies appropriate slots and their types. In a typical embodiment, a query frame has a slot for the query's intent, and additional slots that convey the specific content of the query. Slots may have many types, such as strings, numbers, and pointers to other frames. This allows the creation of interpretations of arbitrary complexity.

Recall that a query (and its interpretation) are called complete if the query, as interpreted, has sufficient information to be actionable—in other words, if the request implied by the query's interpretation can be turned over to execution. According to many embodiments, the precise conditions for calling an interpretation 'complete' are checked by domain-dependent code, which is closely linked to the code that attempts to interpret the query in the first place. The main completeness condition to be satisfied may be that values be supplied (either explicitly by the query, or from some default values) for all required slots in the interpretation.

The locus of execution of an interpretation may depend on the nature of the request, and on the specific embodiment. Information may be gained by searching one or more sources by going to an external PAI; alternatively, answers may have been cached in a local server. Action requests from a user may be handled by creating commands that are sent to a client, such as placing a phone call or adding an appointment in a calendar. In some embodiments, the NLU system 600 executes the user's request. In some embodiments, a third party server performs the execution. In some embodiments, the user's device performs all or part of the execution. In some cases, the attempted execution of a user's request results in a failure, which causes a corresponding response to a user.

According to some embodiments, a virtual assistant always handles incomplete user queries by asking the user questions by way of a modal dialog. The initiative (the power of choosing what question to ask) is taken away from the user, and turned over to the assistant. They are often verbose. And once entered, a modal dialog may not be exited until a complete interpretation is constructed. Hence, modal dialogs are not ideal, and often contribute to creating a poor user experience of the dialog. Fortunately, in some embodiments, the semantic parser can recognize incomplete interpretations, and use the context from the previous conversation to retrieve the critical information needed to complete the request. In such cases, the use of a modal dialog is avoided.

The present invention is directed to a virtual personal assistant that is capable of engaging with a user, conversationally, in a natural, human-like way. Such engagement requires the assistant to show an awareness of the conversation context. This involves gathering, storing, and retrieving dialog context information and using it to understand requests. Embodiments of the invention create this functionality by storing and retrieving information from recent dialog. Access to the dialog context depends on the system's ability to recognize, store, and retrieve context data entities of interest, and to use them when processing queries.

FIG. 4 shows a data structure for dialog history 400, according to an embodiment of the invention. Dialog history 400 is a sequence of dialog layers, stored in time order; technically, the abstract data structure is a queue of layers. In some embodiments, the queue is stored in a linked list; in other embodiments, it is stored in an array. Finally, a circular array is efficient when there is a maximum size for the queue.

A layer may define a correspondence (or map) between named variables and their values. Some variables are explicitly indicated in FIG. 4. Every layer stores at least a creation timestamp, a query's interpretation, query entities, response entities and possibly additional context variables. The interpretation data structure may be, e.g., a frame instance with named slots and corresponding values. An interpretation instance has at least an intent slot, which expresses a query's overall goal, such as searching for a hotel; see FIG. 16. Additional parameters are also stored as variable-value pairs, e.g., a city and a date range for a potential hotel reservation. Example interpretations may be found in FIGS. 15-17. In some embodiments, the user intent determines a frame type for the interpretation, including allowed slots, the role of each slot in the frame, and what slots are required in a frame instance.

Timestamps, when present, allow the measurement of elapsed time. According to some embodiments, data from recent dialog layers is preferred over data from earlier dialog layers. According to some embodiments, a threshold is used to identify sufficiently old dialog history data, and such data is forgotten, meaning that it is removed from the dialog history. Some embodiments use elapsed time to constrain the ability to access past context layers; as discussed earlier, this is part of the dialog history access API. Some embodiments may retrieve some data no further back than (say) two minutes from current time; but it is important that various API parameters, such as a freshness threshold on elapsed time, are entirely dependent and context-dependent. They are determined in every case by the semantic augment for rule. The parameters handed to the API may depend on the type of information sought, and use saliency weights. Also, in some augments, dialog history lookups may be restricted in the number of steps that retrieval can reach back in the dialog, where the number can be specified in the specific programming context where the data is retrieved. Hence there is a powerful combination of a flexible API, and a flexible way of applying it within the context of a grammar pattern, and of the specific code of a semantic augment.

In some embodiments, specific context variables may be remembered longer, or indefinitely, depending on the nature of the individual variables. Context variables that are remembered indefinitely become part of persistent user memory, a complementary mechanism to the one described in this disclosure. The distinction is similar to that between short-term and long-term memory.

In FIG. 4, the dialog layer data also includes query entities and response entities. In some embodiments, saliency weights are assigned to these entities, to assist in their selection and selective forgetting. An example illustrates the difference between query and response entities, and how each of them can be used; the corresponding algorithms will be presented later. The short response to the query 'what is the capital of Japan?' is 'Tokyo;' a longer response can be 'the capital of Japan is Tokyo.' The dialog layer stores the country 'Japan' as a query entity (of type 'Country') and the city 'Tokyo' as a response entity (of type 'City'); in some embodiments, the country 'Japan' is also stored as a response entity. A dialog layer also stores the intent of the query (here, a request for geographical information) and its full interpretation. Following the query 'what is the capital of Japan?' a query such as 'what about China?' may be interpreted, based on query entities, as the specific question 'what is the capital of China?' whereas a follow-up question such as 'what is its population?' may be interpreted as 'what is the population of Tokyo?' based on response entities.

The dialog history data structure 400 may be accessed and modified by way of a set of function (and procedure) calls. In this disclosure, the functions that operate on the dialog history will be referred to as the API functions, and the calls to these functions are referred to as API calls. This is done to help distinguish uses of dialog history 400 from all other activity. For the purpose of this disclosure, it is useful to single out the accesses to dialog history 400, but it is understood that there are alternative embodiments of the same functionality, in which the so-called API functions could be implemented (e.g.) in straight code, devoid of function calls. These are implementation details.

In an embodiment, there is an API call to create a layer (the call sets a timestamp for the new layer); there are API calls to set each of the slot variables in the new layer; these include the intent, the other slot-value pairs in the interpretation, the query and response entities, and any additional context variables. Alternatively, the layer contents may be built outside of the API. There is an API call to add the new layer to the front of the queue; the layer is placed in the most recent layer position in dialog history 400; it is shown as the front layer in FIG. 4. There is also an API call to delete a layer at the back of the queue; it is shown as the back layer in FIG. 4. The API calls listed so far support the creation and maintenance of dialog history 400.

There are also API calls to retrieve information from dialog history 400. Such calls are not layer-specific; they are directed instead to dialog history 400 in its entirety. It is possible to look for the most recent value for a designated slot name; query entities and response entities are just slots themselves. Slot-value pairs are looked up in time order, most recent layer first. If a value is found for a slot, it is returned with a timestamp and a layer position: 0 for the most recent layer, 1 for the next layer, etc. In an embodiment, a unified retrieval API call could serve most retrieval purposes, though the use of optional parameters. For example, an optional parameter can limit the time elapsed between the creation time of the layer and the current time; and another optional parameter can limit the layer position, e.g., a limit position of 0 would indicate that only slot values from the most recent dialog turn will be used. Further variants of retrieval API call can be defined, e.g., to take saliency weights info account; the returned values from dialog history 400 may not be governed by strict time order, allowing saliency to play a role in the selection of slot-value pairs. Saliency weights will be discussed shortly.

FIG. 5 illustrates exemplary frame types that may be used, in an embodiment, to store query or response entities associated with a dialog layer. These are abstract data types that list exemplary slot names and their individual types; the illustrated slots focus on answers to WH-questions such as WHEN (a DateTime), WHERE (a Place), WHO (a Person) and so on. Dialog history layers may not store only answers to WH-questions; domain-dependent information for specific domains and applications is also stored, including airline codes and flight numbers, points of interest such as restaurants, gas stations and airports, and the like. Some examples are shown in FIGS. 15-17.

Instances of a dialog layer data structure hold values for the slot variables. In an embodiment that supports types, slot values must match their slot type. Values may be simple and self-contained (such as the value of a HOW MANY slot which is an integer); they may also be objects a.k.a. entities (or internal pointers to entities) that act as entry points into arbitrarily complex networks of inter-related data, such as data structures and databases; or finally they may be expressions—data structures that, if/when evaluated, yield a value of one of the previous types. The latter are unevaluated expressions. For example, we can have an ADDRESS slot whose type is <an Address> and assign to it an expression that is the internal representation of 'Uncle Robert's country home' and that (once given access to the user's address book, for example) will properly evaluate to an Address.

If a slot has no value assigned to it, the slot-value pair may be absent altogether; alternatively, a NULL value (of some sort) may be used. In the examples of FIGS. 15-17, a question mark ("?") is used to denote an unassigned value. Timestamps may also be associated with slot values. In an embodiment, at most one value is allowed in a slot. In some embodiments, multiple values are allowed in each slot. In an alternative embodiment, a variable-length array of values may be used as the value of a slot variable, to represent multiple values.

In the embodiment of FIG. 5(*a*), saliency weights are not assigned to slot values. In the embodiment of FIG. 5(*b*), each variable-value pair has a corresponding saliency weight, which expresses its importance in the dialog history. The callers of API functions used to store the dialog data may wish to assign saliency weights at every call; this lets the weights be query-dependent or domain-dependent. However, saliency weights may also be used generically to affect retrieval of dialog data. The saliency of a query entity, or that of a response entity, can affect the processing of an incomplete interpretation, for example, to choose between alternative interpretations of an expression.

The data structure of FIG. 5 is shown with a specific set of slot names: WHO, WHAT, WHEN, WHERE and QUANTITY. However, in general, the set of slot names is open-ended. In some embodiments, a specific set of context variables is known at compilation time, and the context association is limited to these variables. Such a fixed scheme has certain drawbacks in a dynamic environment. In some embodiments, new slot names may be created at will enabling creation of new domains to the assistant. This implementation has greater flexibility. In some embodiments, each slot may have an associated type that is used to constrain the legal values for the slot. In some embodiments, type constraints are strictly enforced. In most embodiments, semantic type expectations are present in one form or another. For example, a WHEN slot may expect a value of type DateTime, which represents a date and/or time of day; this may include DateTime constants, as well as expressions that (in context) evaluate to a DateTime, such as an internal representation for 'next Monday'. In this disclosure, 'a DateTime' in a short-hand for 'a DateTime-valued entity' or 'a DateTime-valued expression.' The same holds true for 'a Person,' 'a Place,' 'an Amount,' etc. Accordingly, the WHO slot expects a Person, the WHERE slot expects a Place, and the QUANTITY slot expects an Amount. Yet, the set of slots is open-ended. Additional slot names can be added for different purposes, such as: OWNER (a Person or a Corporation) or PRICE (a MonetaryAmount), where aMonetaryAmount is defined as comprising an Amount and a Currency (say, USD or ¥); and so on.

Figure 6:
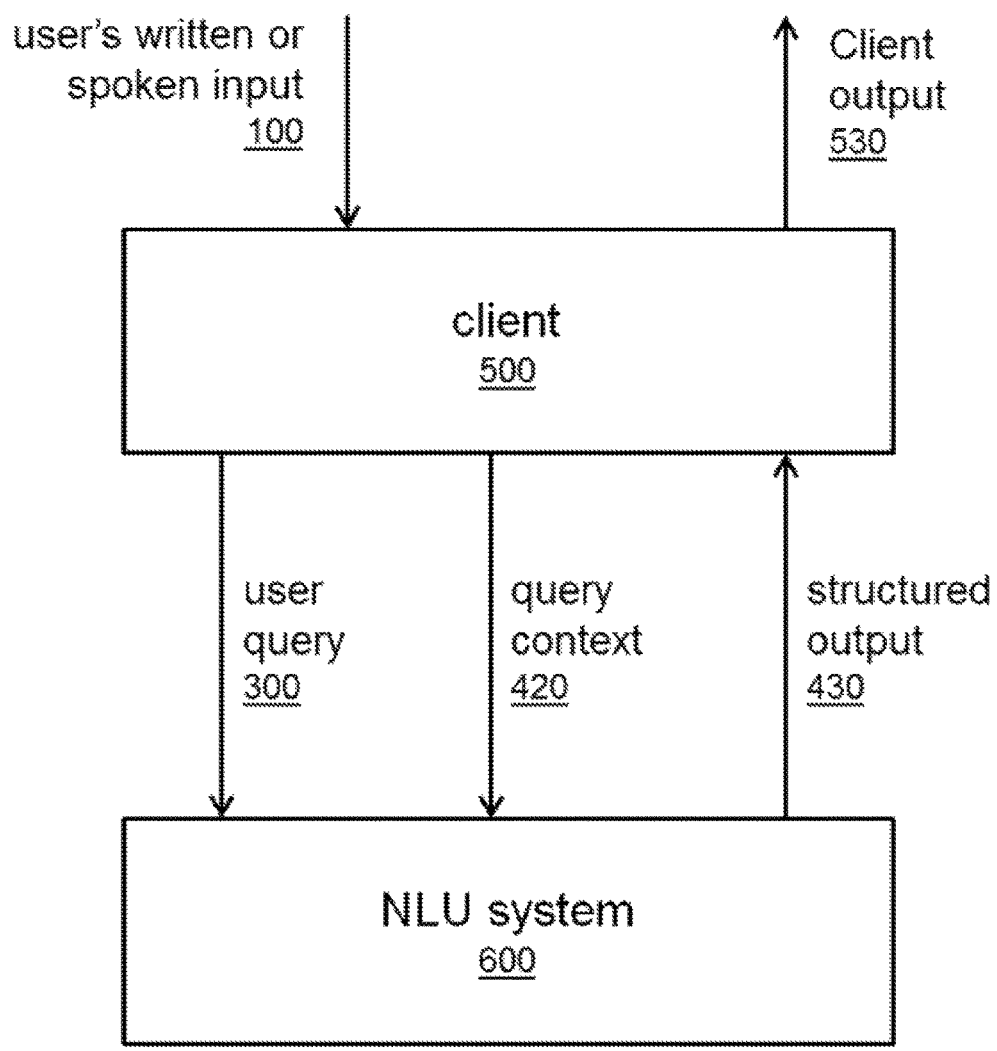
FIG. 6 shows information flow between a client and a NLU processor according to an embodiment of the invention.

FIG. 6 shows information flow between a client and a NLU processor according to an embodiment of the invention. In some embodiments, the NLU processor resides on a server. In alternative embodiments, the NLU processor resides on a local device. Client 500 interacts with a user, accepting a user input 100, which may be written and/or spoken input. Based on user input 100, client 500 sends user query 300 to NLU system 600. Along with the user query 300, query context 420 is also sent to NLU system 600. In response, NLU system 600 sends structured output 430 back to the client 500.

User input 100 may be received through a user input device. For example, user input 100 may be received as a combination of speech received by a microphone device, text entered from a text entry device such as a physical keyboard, a virtual keyboard, an on-screen keyboard, button pushes, taps, swipes, shakes, any movement of a pointing device such as a mouse, text recognized from a camera, gestures or facial expressions captured by a camera, singing, humming, biometric signals, and any other forms of input that a user can produce. This disclosure focuses on using spoken or written natural language as user input 100, but it is understood that changing or adding modalities does not affect the methods disclosed in a significant way.

The structured output 430 is a data structure of a digital signal returned by the NLU system 600 to the client 500. Based on structured output 430 and on an application program executing on the client 500, client output 530 is created for the user and produced by a client output device. For example, client output 530 may be comprise any combination of multimedia outputs produced by client output devices, including a voice spoken through a speaker, sound effects, text displayed on a screen, vibrations, and any form of output that contributes to the quality of interaction between the user and the system. This output behavior is under the control of a fully programmable application executing on the client. In the main case of interest, spoken words received by a microphone and generated voice spoken through a speaker are the primary mode of user interaction for a conversant natural language understanding system.

In a server-based embodiment, client 500 communicates with NLU system 600 via a network; in alternative embodiments, NLU system 600 may execute locally on the client device (that is, a user device hosting client 500), or on a processor directly connected to the client device. Client 500 sends the user query 300 and query context 420 to NLU system 600. Client 500 may include, as part of query context 420, information such as client device location, client device state, and other relevant metadata that it sends along with user query 300. In some embodiments, query context 420 may also include dialog context information, as will be discussed later.

In response to a user's query, NLU system 600 sends structured output 430 to client 500. Structured output 430 may contain one or more of audio sample information, phoneme information, a text string to be spoken, a text string to be displayed, prosody information related to a spoken response, or other metadata useful for generating system output. It may also contain data that cause the client to display graphics, including a map with clickable regions, or to ask the user to disambiguate between alternatives. The richness of possible communication between the client and the NLU system varies greatly from one embodiment to another. This richness may result from the sharing between client and NLU system of interface formats for communication, and the rules for their interpretation. In some embodiments, structured output 430 may include dialog context information.

Figure 7:
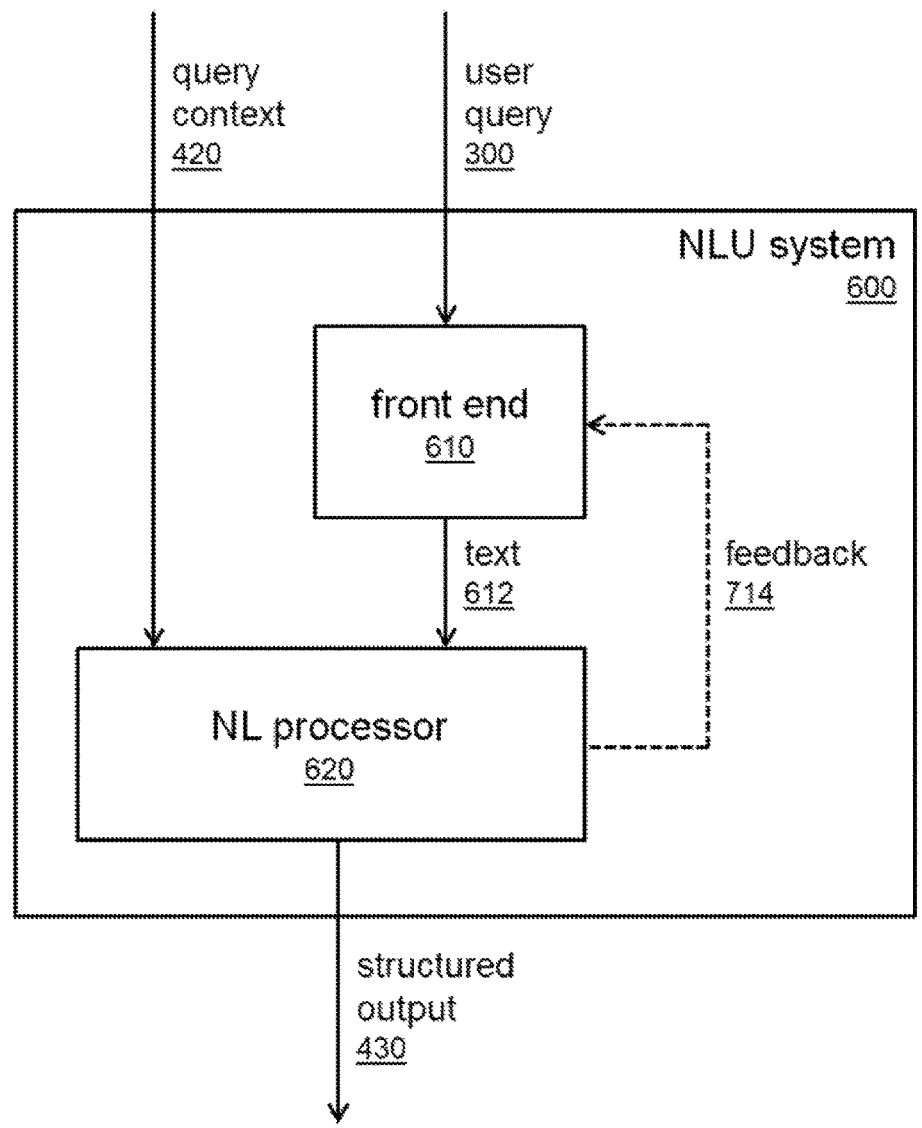
FIG. 7 shows information flow through a front end and NL processor within a NLU system according to various embodiments of the invention.

FIG. 7 illustrates NLU system function according to various embodiments of the invention. FIG. 7 is intended to be a generic template for various specializations of the system that embodies the invention. The embodiments shown in FIGS. 7-10, regardless of the nature of the user query 300 (speech or text), have common inputs (user query 300 and query context 420) and a common output (structured output 430). NLU system 600 comprises a front-end 610, which receives user query 300 and produces text 612 as output. The system also comprises a natural language processor, NL processor 620, which receives text 612 and (optionally) query context 420 from client 500. NL processor 620 generates structured output 430, a structure whose components will be described later. As further explained below, front end 610 may rely on the use of optional feedback 714 from NL processor 620 to improve its accuracy or robustness of the processing of user queries.

Figure 8:
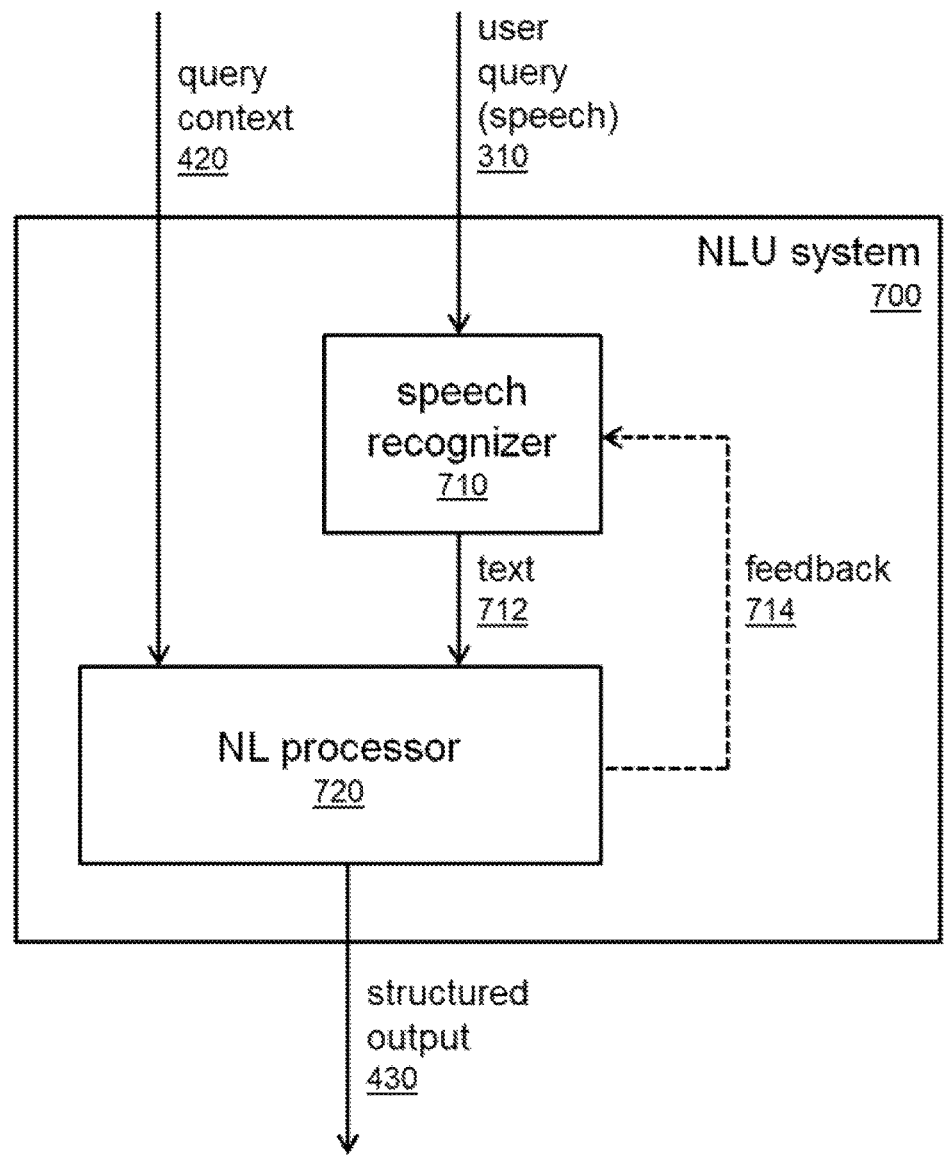
FIG. 8 shows information flow through a speech recognizer front end and NL processor within a NLU system according to an embodiment of the invention.

FIG. 8 shows a NLU system 700 where user query 310 is specifically speech, and the front end is speech recognizer 710. Speech recognizer 710 maps speech into text that is used as input to NL Processor 720. In one embodiment, text 712 is the best-scoring transcription of the user speech, according to a score measure defined by the speech recognizer 710. In another embodiments, text 712 is an enumeration of N best-scoring transcriptions of the user speech. Each transcription is a hypothesis submitted to the NL processor 720 for further processing and selection. In other embodiments, the optional feedback link 714 is used to support the deep integration of speech recognizer 710 with back-end NL Processor 720, for improved robustness. Feedback from the back-end processor 720 to the front-end processor 610 is an alternative technique to the feeding forward of multiple transcription hypotheses. Although more complex, it can be more robust due to the deeper level of integration between speech processing and natural language processing.

Figure 9:
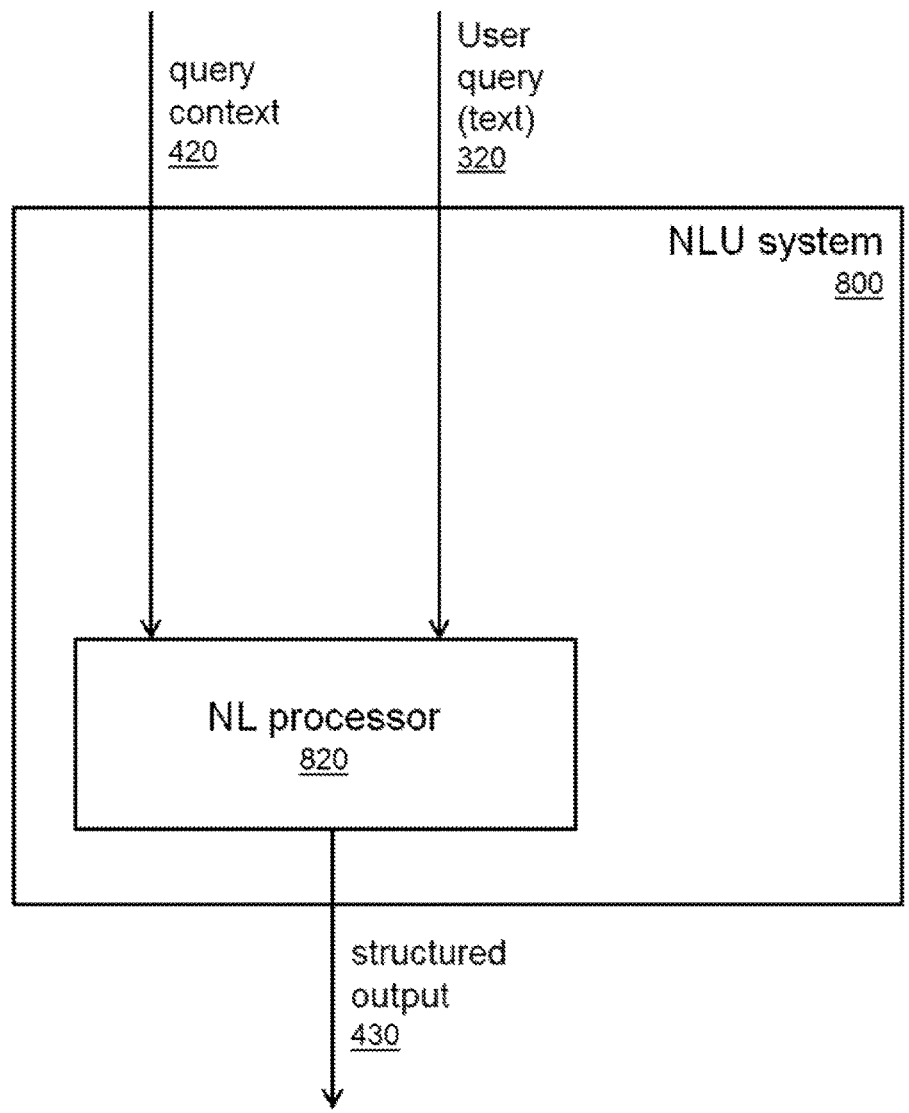
FIG. 9 shows information flow directly through a NL processor without a front end within a NLU system according to an embodiment of the invention.

FIG. 9 shows an embodiment of the invention where user query 320 sent to NLU system 800 is specifically text. The techniques disclosed herein apply equally to text and to speech input; in this case, the system operates without a need for a front end, and NL processor 820 does all the work expected from NLU processor 800.

Figure 10:
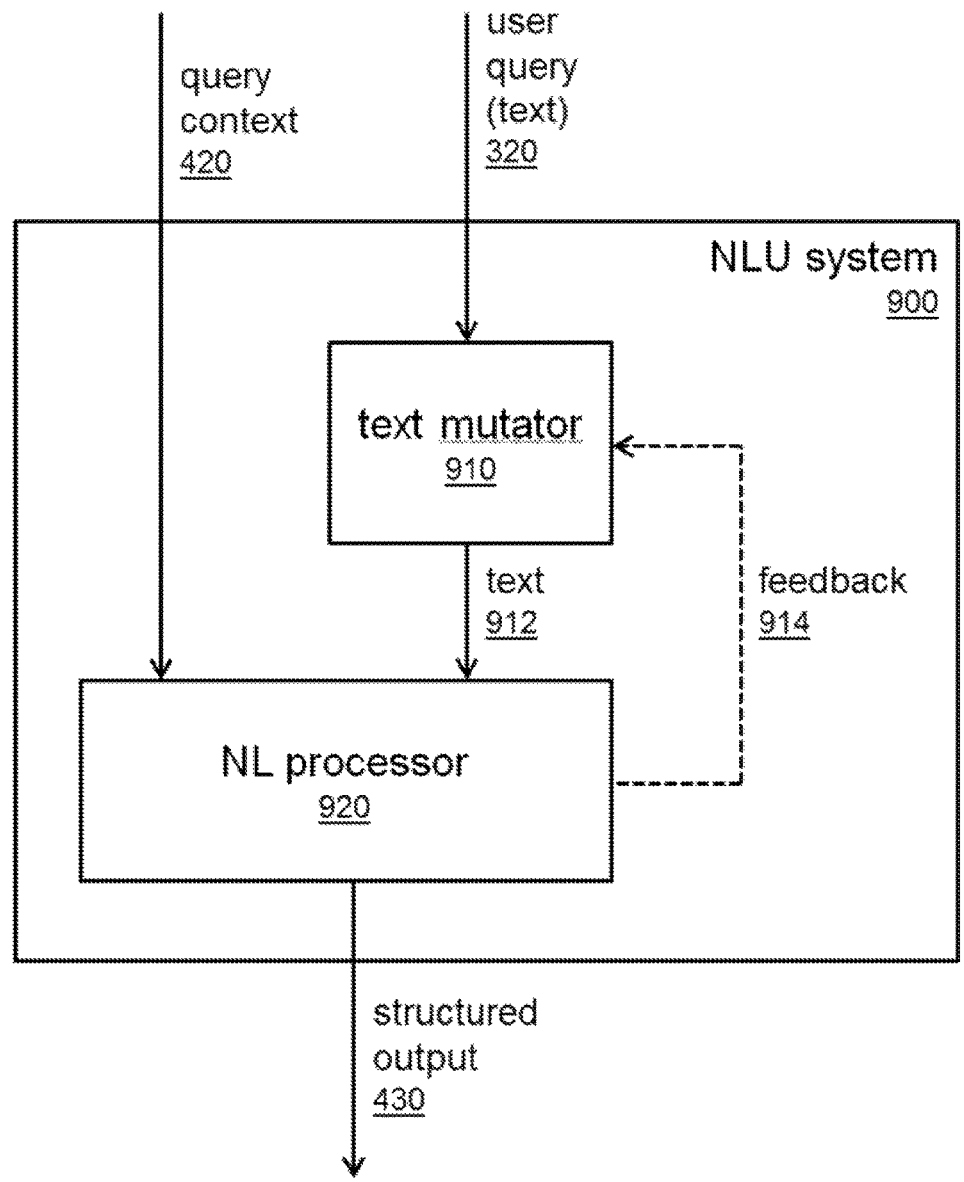
FIG. 10 shows information flow through a text mutator front end and NL processor within a NLU system according to an embodiment of the invention.

FIG. 10 shows another embodiment of the invention where user query 320 is text. In this embodiment, however, there is a front end, text mutator module 910 that takes text as input and generates a text sequence with a likelihood score. Text mutator module 910 may, for example, use a dictionary in an attempt to correct spelling errors before text 912 is sent as input to NL processor 920. In some embodiments, a statistical language model (SLM) is used to assign a likelihood score to a text sequence. The use of a SLM helps suggest highly likely corrections to the user query 320. In some embodiments, text 912 is the highest-scoring hypothesis from text mutator 910. Knowledge of the physical layout of the user's keyboard can also help text mutator 910 make plausible typo corrections. In an embodiment, text 912 includes the N best-scoring hypotheses, together with their likelihood scores. NL processor 920 then chooses among the transcription hypotheses. In yet another embodiment, the optional feedback link 914 allows NL processor (which embodies natural language syntactic and semantic constraints) to interact with one of the variant embodiments of mutator 910 for better robustness; the tightly coupled embodiment allows typo correction to benefit fully from the syntactic and semantic guidance that the NL processor is capable of providing.

Various integration methods may be used to increase recognition robustness. In some embodiments, the NLU system's response (structured output 430) is processed by a client-based application, which performs domain-specific tasks, such as displaying results, making a call or sending a SMS message, and can also report error conditions.

Figure 11:
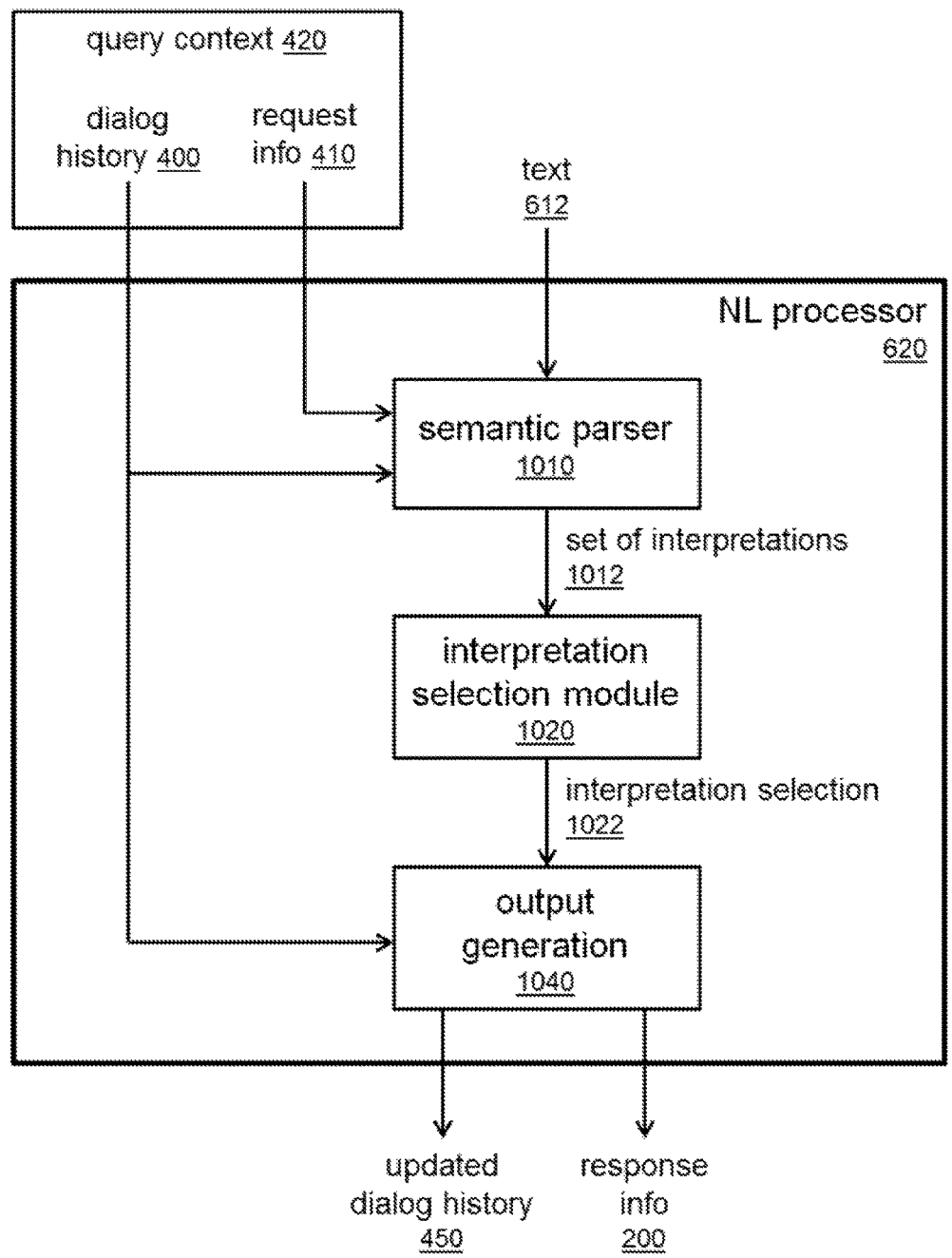
FIG. 11 shows information flow through a NL processor according to an embodiment of the invention.

FIG. 11 illustrates the flow of data in and out of NL processor 620. It shows that query context 420 includes request info 410 and dialog history 400. Request info 410 comprises a heterogeneous grouping of parameters, including client location, client local time and time zone, user ID, version ID for the software, and other context parameters available on the client at the time user input 100 is initiated. In an embodiment, request info 410 and dialog history 400 are both received serially in their entirety from client 500. In another embodiment, some of this data may be cached in data structures local to the NL processor, since the data remains constant much of the time, i.e., for the duration of a user session. This idea can save transmission times, at the expense of some software complexity.

FIG. 11 also illustrates an embodiment of NL processor 620. According to FIG. 7, NL processor receives text 612 from front-end 610. Recall that FIG. 7 is a generic view of the system, and FIGS. 8-10 represent particular embodiments, whose differences do not affect any essential aspect of the disclosure. The key tasks of NL processor 620 are to parse and interpret a query, while collecting a set of plausible interpretations; to select among alternative interpretations; to create a response for the user; and (as a means of supporting these tasks) to correctly access and maintain the dialog history. After user query 300 is mapped to text 612 by the front-end, parsing and interpreting the text is the responsibility of semantic parser 1010. In one embodiment, semantic parser 1010 finds at most one interpretation of the input query, and interpretation selection module 1020 is unnecessary. In another embodiment, able to handle ambiguity among interpretations, the set of interpretations 1012 returned by semantic parser 1010 comprises zero, one or more plausible interpretations of a query; the most interesting case occurs when two or more interpretations are returned. In one embodiment, interpretation selection module 1020 forces the selection of a single interpretation from the set of interpretations 1012. In another embodiment, interpretation selection 1020 can recognize situations where a choice between highly plausible interpretations should be left to the user for an explicit disambiguation. In the latter case, interpretation selection 1022 may comprise more than one interpretation.

In all embodiments, output generation module 1040 is tasked with the preparation of structured output 430, comprising response info 200 and updated dialog history 450. Response info 200 is the primary output of the NL processor. It is sent to the client and aims at presenting the system's answer in a form that the user understands. Response info 200 is specially formatted data, received by a client application that decides how to present the information to the user. In some embodiments, response info 200 is plain text, which will be typed for the user on a display. In other embodiments, response info 200 is rich and deeply structured. The response info may contain serialized data, and URLs or links that allow client 500 to display a rich multimedia response as the output 530 received by the user; this includes playing sound, video or animations, showing images, placing calls, updating calendars, and so on—controlling through the client application any effect that is achievable using local API's or remotely accessible API's. (Note: the API's mentioned here are not the dialog history access API's mentioned elsewhere; they are, according to the more common use of the term, API's provided by third parties, such as a smartphone API to access a user's contacts, a weather information API or an API to access a web-based calendar application.)

The other component of the structured output 430 is updated dialog history 450, which plays a key role in the present disclosure. Updated dialog history 450 is the state of the dialog history that is expected to accompany the next user query 300 as current dialog history 400. In the embodiment shown in FIG. 11, the NL processor 620 has sole responsibility for updating the dialog history 450. NL processor 620 outputs an updated dialog history 450 at each dialog turn; it must receive the most recent dialog history 400 as input whenever a user query 300 is received; it outputs an updated dialog history 450 whenever a response info 200 is sent. In some embodiments, at least parts of dialog history 400 are stored on the client device. In some embodiments, at least parts of dialog history 400 are stored on a server. Regardless of where the dialog history 400 is stored (a client, a server, or any combination of devices) it is expected that the updated dialog history 450 created by NL processor 620 will be echoed, unmodified, as dialog history 400, which is an input to NL processor 620. In a preferred embodiment, dialog history 400 remains unmodified (and even unexamined) by any client or server that helps to store it outside of NL processor 620. When a client initiates transmission of a new user query 300, the most recently created updated dialog history 450 must be retrieved as current dialog history 400. This may be achieved by storing dialog history data (sent as 500 and read back as 400) using server-side storage, client-side storage or any combination. The pros and cons of each approach will be discussed later.

It should be noted that, although dialog history data remains unmodified by the client, the actual sending of dialog history data from the client to the NL processor 620 is not compulsory. If a client has reasons to believe that the next request will be part of a new conversation, and not a continuation of a previous conversation, the dialog history it sends to the NL processor may be empty. This may happen, e.g., when the client first starts running; when a user session has ended and another has begun; or if significant time has elapsed since the last query, exceeding some thresholds that may have been set for remembering the conversation context.

In some embodiments of the NLU system, user query 300 and query context 420 (the latter comprising request info 410 and dialog history 400) are sent simultaneously to the NLU system, as part of a bundled request from the client. Conversely, response info 200 and updated dialog history 450 are also sent simultaneously to the client from the NL processor as a bundled response, the structured output 430. In alternative embodiments where the dialog history data is not stored on the client, dialog history 400 is not bundled with response info 200, but user query 300 and request info 410 can still be a part of a bundled request.

In some embodiments that require particularly low latency, the client may transmit the user query 300 incrementally, as a stream that is received and processed as a stream of data. This may apply to either speech or text. In such embodiments, the NLU system is designed for incremental processing all the way through; both front-end and back-end processors handle the user's input as a stream, be it an audio stream or a text stream. In such embodiments, request info 410 and dialog history 400 are transmitted at the beginning of a new user query, and the rest of the query is transmitted over time, in fairly short increments. A NLU system can take advantage of incremental transmission (in the output direction) to improve user experience, for example, by frequently updating the current best transcription; a final preferred transcription is sent when it has settled, along with a corresponding structured output 430.

For each selected interpretation, an API call adds the interpretation to the dialog history, as a dialog layer with a timestamp and an optional saliency weight, acting as a relative likelihood score. Further, entities in the interpretation frame whose type is of interest (such as locations, people, products, and quantities) are added to query entities with an API call; in some embodiments, each API call that assigns a value to a slot may also give a saliency weight to the slot-value pair; the saliency weight is recorded in the associated structure. The same applies to response entities, gathered from the internal interpretations built by output generation. An entity mentioned in a response, and whose type is of interest to the system, is added to the current layer's response entities using an API call; in some embodiments, this call also gives a saliency to the response entity, which is stored in the associated saliency weights.

When adding entries to the dialog history, it is important that the depth of the dialog history remain bounded; thus, there must be a forgetting aspect in the maintenance of dialog history. This is partly due to space considerations, but memory space is not scarce; transmission times—the time needed to send the dialog history back and forth at every dialog turn is also a factor. This said, human cognitive limits on discourse understanding are also a critical factor.

In some embodiments, a memory management discipline is used for dialog history, which includes selective forgetting. In particular, old data may be forgotten as new data is entered, for example, to keep the number of layers in the dialog history within a given depth limit, such as 4 layers, or to keep the time elapsed since the creation of an older layer within a time threshold, such as 3 minutes. Space is a secondary consideration, since memory space is cheap. Furthermore, the time taken to store and later retrieve the dialog history at successive dialog turns is secondary. Besides history depth and elapsed time, the forgetting process may also be affected by a likelihood score for an interpretation, or a saliency weight used to measure the importance of an entity. All of these factors may be used in combination to control the forgetting of dialog history layers.

Human cognitive considerations in discourse understanding do not simply affect the forgetting process during a dialog; they also affect the retrieval of context information from the dialog history through a selective access. A maximum time difference threshold may be set between the creation times of interpretations, and a larger threshold for saved entities. This gives the user the sense of starting anew when a substantial time has elapsed since the last query. In some embodiments, the elapsed time threshold may depend on the subject matter (intent) and other factors. A penalization scheme may be applied, so that the likelihood of retrieving data from previous layers is a function of elapsed time. For example, a time amortization factor influencing the saliency weight may play a role in the selection of the most likely interpretations.

FIG. 11 also illustrates the multiplicity of possible interpretations that may result from a user's query. The input to semantic parser 1010 may be a single text transcription, or it may already have built-in ambiguities, comprising of a set of alternative transcriptions of the user's query. Semantic parser 1010 takes as input one or more transcriptions of a spoken query, or a written text, or even a word lattice, and it is responsible for parsing the input and interpreting it in as many ways as possible and plausible. Since sentences may be ambiguous, even a single transcription may be parsed and interpreted in more than one way. The possible (or at least plausible) meanings that result are represented as a set of interpretations 1012. Every interpretation receives a score that represents its probability, or likelihood. The likelihood score may be based on a speech acoustic score and a probability assignment in a stochastic grammar.

Interpretation selection module 1020 determines a set of selected interpretations. In an embodiment, a single most likely interpretation will be selected for use by output generation 1040 as a basis for creating a response. In some embodiments, multiple selected interpretations are retained, and output generation 1040 may ask the user to disambiguate among the selected interpretations from semantic parser 1010. For an information request, it is valid for output generation 1040 to give responses for each of the query interpretations. In some embodiments, output generation 1040 uses much dialog intelligence, notably to optimize the naturalness of the user experience. Output generation 1040 has default behaviors that can handle a situation where the user's query cannot be parsed or cannot be interpreted in a meaningful way.

Figure 12:
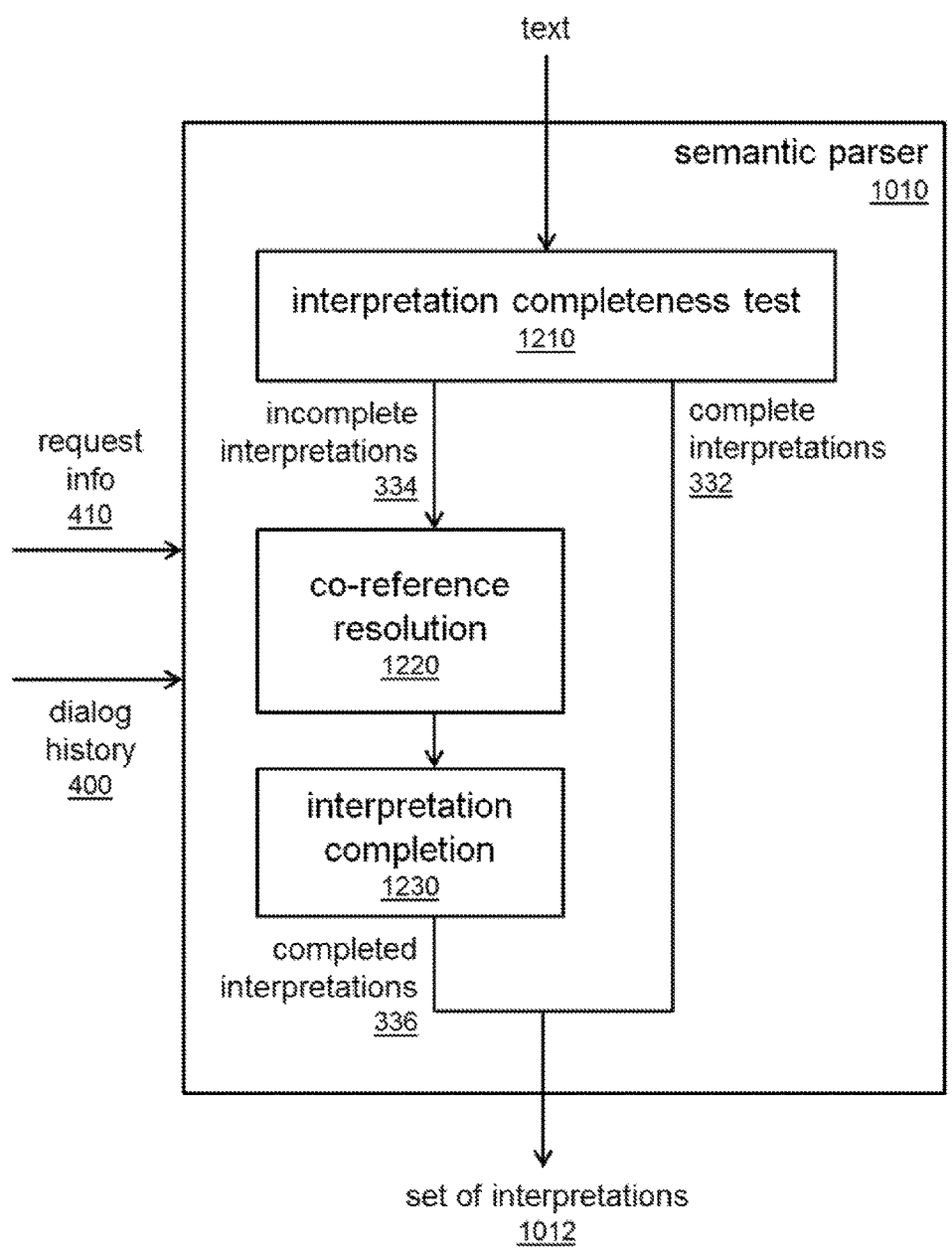
FIG. 12 shows information flow through a semantic parser according to an embodiment of the invention.

FIG. 12 shows a semantic parser according to some embodiments of the invention. Semantic parser 1010 relies on a set of rules, or patterns, to recognize the structure of query and build up their interpretation. In some embodiments, patterns are rules in a context-free grammar, and semantics are carried out in a syntax-directed manner; examples of such semantic parsers are known in the field. Other embodiments rely on a looser form of structural analysis; for example, parts-of-speech labeling (POS) may be used to isolate language constituents, they statistically or otherwise derive patterns to group constituents at a high level.

A complete natural language patterns is distinct from an incomplete natural language pattern. A complete language pattern is known to yield a complete interpretation. For example, the query 'find me flights to <DESTINATION> on <DATE>' is complete, even though there is no<DEPARTURE_CITY> for the flight, because by default the departure city could be the nearest airport to the user's location.

In contrast, an incomplete language pattern is one whose interpretation is known to be incomplete. It matches an incompletely specified expression, where it is known that additional information is required before the interpretation is complete. For example, the query 'what about Seattle?' is incomplete because it has no specific meaning without the context of previous dialog. In an embodiment, all interpretations generated by a semantic parser may be pursued separately, subject to trimming by likelihood score thresholds or storage limitations. In FIG. 12, semantic parser 1010 generates a set of interpretations for a query. An interpretation completeness test 1210 that is an optional part of any semantic augment decides which interpretations are complete. Note that in most cases, a rule's pattern alone (i.e., mere syntax) is sufficient to distinguish complete patterns from incomplete patterns; but syntax is not always sufficient to make the call. For example, 'find me a flight to SFO next Monday' should be treated as complete if the user's location is known, and incomplete if it isn't.

The interpretation completeness test 1210, for clarity in FIG. 12, allows the processing of queries using two separate processing paths. In the figure, a set of completed interpretations 336 (from interpretation completion 1230) and a set of complete interpretations 332 (from pattern completeness detection 1210) are merged (by set-wise union) to create as an output the set of interpretations 1012; according to FIG. 11, this set 1012 provides the candidates for selection by module 1020.

A first type of incomplete interpretation results from under-determined constituent expressions, i.e., partial or ambiguous names, pronouns, or any constituent expressions that fail to be identified as a known value or entity in the domain. For definiteness in any complete interpretation, such under-determined expressions need to be resolved to a known entity, if possible. This may be done using co-reference resolution techniques, which were mentioned earlier. In this disclosure, an alternative approach to co-reference resolution relies on access to the dialog history, by way of API calls, in order to retrieve relevant query entities or response entities. Of course, this may be guided by a specific grammar pattern or grammar augment. For example, the pattern 'Is there Chinese food near the airport' could have two potential interpretations, the first based on the airport closest to the current location, which is a known context parameter. The other is based finding an airport near a city mentioned in the recent dialog. The augment, in this case, would "know" to use an API call to find the desired city in the dialog history. Depending on the situation, either or both interpretation may fail or succeed.

A second type of incomplete interpretation results from missing an entire previous interpretation. For example, in the mortgage domain, the incomplete query 'What about 3.75%?' is not addressed by filling in a value or an entity, but by retrieving from dialog history a recent interpretation for a complete mortgage query, and replacing its interest rate with a 3.75% interest. This is a kind of "update" or "merge" of a former interpretation by a new incomplete one. As before, this operation may be carried out while guided by a specific grammar pattern or grammar augment. For example, the pattern 'how about <PERCENTAGE>' can be recognized in the mortgage domain, and the corresponding augment has been programmed to look for a recent mortgage query. It might also check easily that the supplied percentage is reasonable, and have available funny answers for out-of-reasonable-range values.

Although request info 410 is a part of query context 420, other sources of context information may be accessed from the NL processor and/or the client application. These sources include, for example, persistent structures such as a user's address book, user preferences and other memorized facts about the user. In an embodiment of the invention, the user's address book may be copied and stored on a system where it can be accessed by the NL processor. Persistent sources of context data may be handled by different techniques, but the various mechanisms complement each other towards the understanding of a query in context. For example, the query 'call John' may be unambiguously interpreted in the context of a dialog where a recent reference was made to a Person called 'John' (especially if a phone number is known for that Person) however a virtual agent could otherwise turn towards the user's address book (especially of there is only one close friend called John). Each of which may result in some ambiguity and the need for a disambiguating dialog.

Persistent context has not been made explicit in FIG. 12. If an entire previous interpretation information is missing, it will not be addressed by persistent information. But it can often be obtained from the dialog history, using an API call. The work is done by interpretation completion module 1230, which performs a merge of interpretations.

The merge works as follows. If the current interpretation has a specified intent, the algorithm search dialog history interpretations for a matching intent. This is done achieved by supplying the known intent as an argument to the interpretation retrieval API; there may be additional parameters in the API call to narrow down the search, such as constraints on recency, saliency, or the number of intervening dialog steps. Dailog history is searched, most recent layer first, for an interpretation that matches the given parameters. If found, the search returns the most recent interpretation that matches all the parameters, including the specified intent. If instead the query specifies no intent, the API call will not include an intent constraint, and the search of the dialog history will return the most recent (and sufficiently salient) interpretation, regardless of intent. Note that in general, several domains may attempt to interpret a query. For example, both the mortgage domain and the arithmetic domain can try to interpret the pattern 'how about <PERCENTAGE>' and only one of them may find a match in the recent dialog.

Figure 13A:
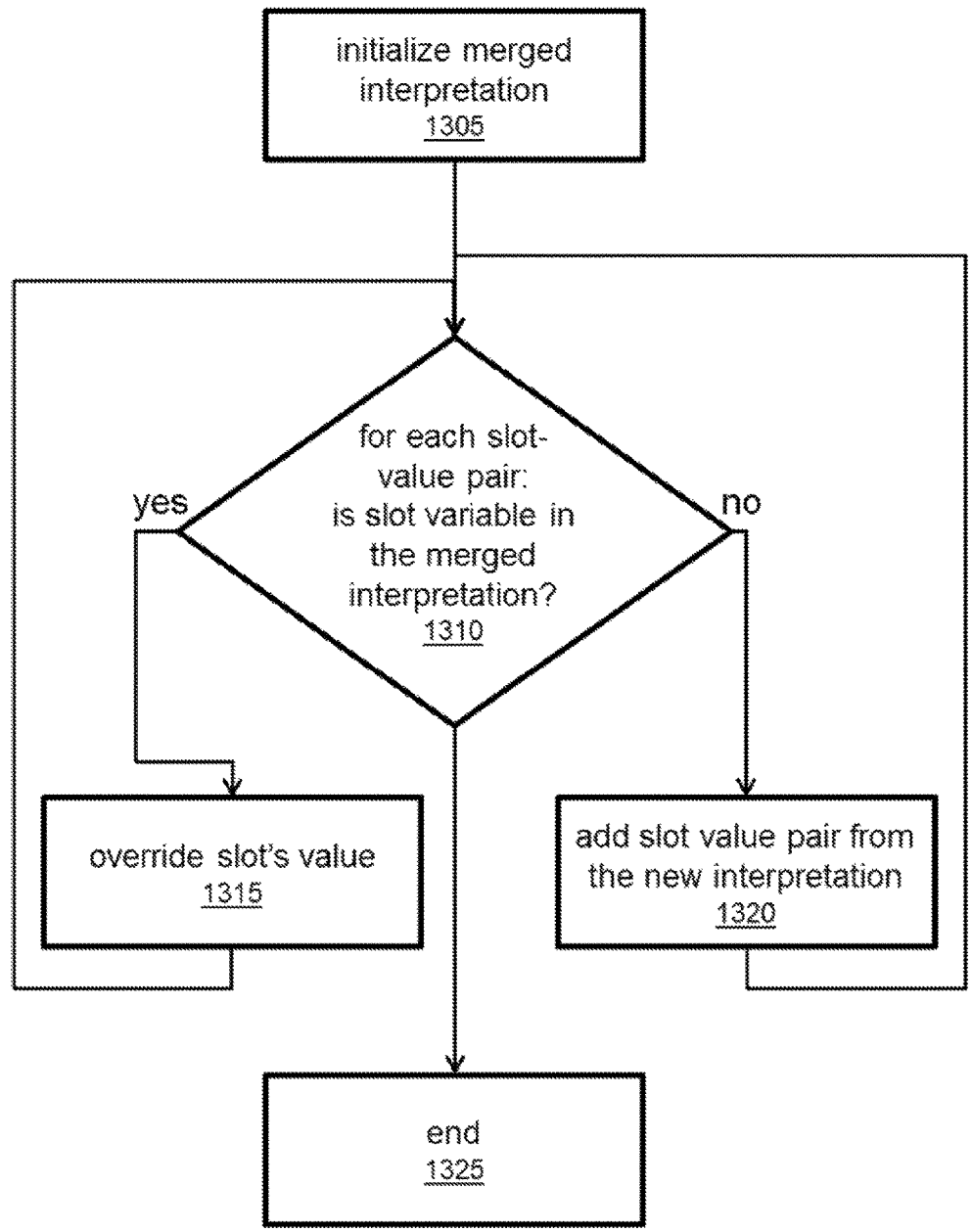
FIGS. 13A and 13B show two variants of an algorithm for merging interpretations, according to an embodiment of the invention.
Figure 13B:
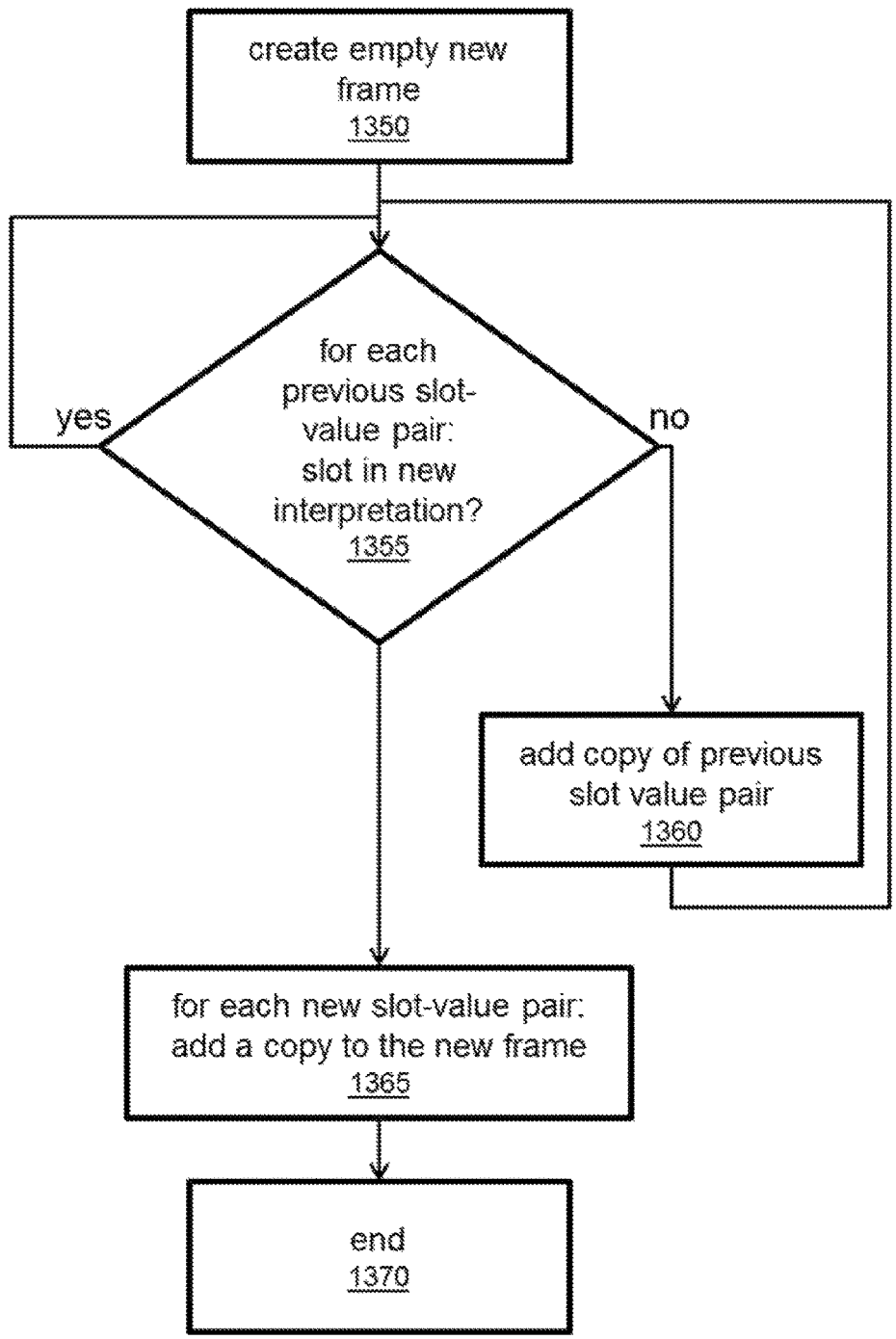

The next step is to disclose the method used by the system to perform a merge between a previous interpretation (retrieved from dialog history) and a new incomplete interpretation, which is the interpretation of the incomplete query just parsed. A simple merging algorithm is given in FIG. 13A. The merged interpretation that is created in the first step of the algorithm is modified in place to hold the desired result of the merge. The basic principle is that the merged interpretation is the same as the previous one, except that new slot-value pairs override (replace) old values with the same slot name. A more efficient way to perform this merge operation is the variant algorithm spelled out in FIG. 13B. The result is the same but its implementation uses less space, and it is faster as well.

Both variants of the merge algorithm make deep copies (the concept of a deep copy is known in the art) of the structures involved; this comes at a cost. In case it is known that the previous or the new interpretation will be discarded after merging, it is possible to write more efficient, in-place (destructive) variants of the algorithm, where copying is avoided.

After executing the co-reference resolution module 1220 and the interpretation completion module 1230, a completed interpretation may be obtained, in which case it is added to the completed interpretations. It is important to note that if either module 1220 or module 1230 creates new ambiguities by completing an interpretation in more than one way, all of the possible completed interpretations will be added to the completed interpretations, each with their respective likelihood score. Ideally, the dialog history only contains complete interpretations. However, if modules 1220 and 1230 fail to produce a completed interpretation, and if the set of complete interpretations is empty, the system will allow an incomplete interpretation to reach output generation, In such a case, the output generation may ask follow-up questions from the user. This is the case where the use of conversation context has failed, and the system behavior drops back to a modal dialog—which at least amounts to the agent asking the user a completion question.

In this embodiment, if there are no complete interpretations 332 (that result from complete patterns) and no completed interpretations 334 (that result from incomplete patterns, followed by the application of modules 1220 and/or 1230) the system will allow incomplete interpretations to appear in the set 336. As they are not complete, and the system has not be able to use the dialog context to complete them, it will fall back on the use of a modal dialog to ask the user for the missing information.

Figure 14:
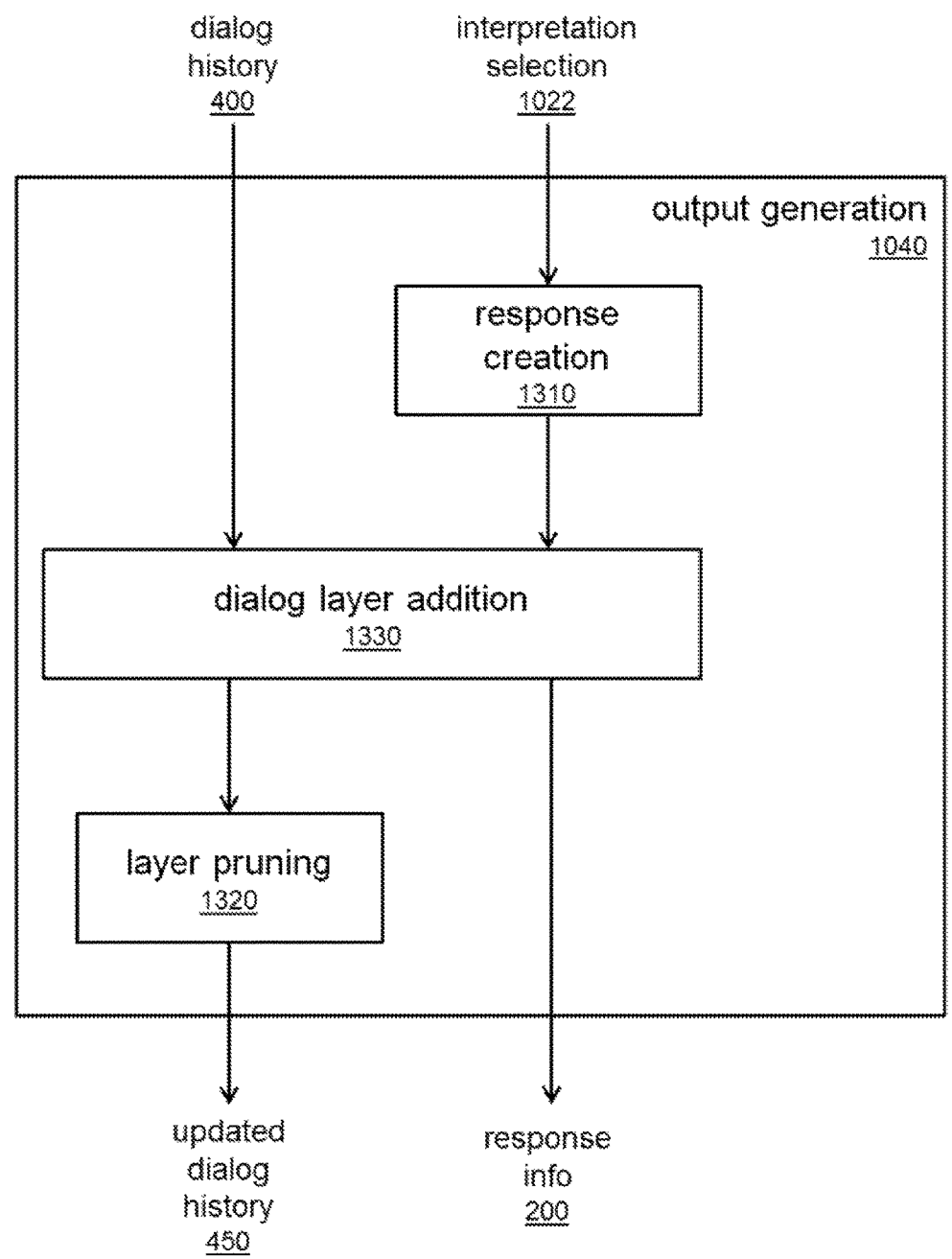
FIG. 14 shows information flow through an output generation module according to an embodiment of the invention.

FIG. 14 gives details on output generation module 1040, notably how it creates an updated dialog history 450. The present description focuses on the handling and use of dialog history. For response creation 1310, three main cases occur. First, there is a case where the system has no answer; various strategies exist to deal with this case, in terms of what response is given to the user. But no matter what the system tells the user, the updated dialog history 450 is equal to the previous dialog history 400.

In the second case, interpretation selection 1022 has a single interpretation, and it is complete. This is the new interpretation. A response is made by response creation module 1310, based on the new interpretation. (Needless to say, response creation module 1040 has a great deal of additional functionality, that is not discussed in this disclosure; that would be off-topic.)

There are additional cases involving ambiguity. First, if there remains more than one interpretation, the user may be asked to make a choice. The new interpretation in that case amounts to the 'or' of the remaining alternatives. This is a kind of split layer. Second, if an interpretation remains that is still under-determined, a modal dialog will be entered. During a modal dialog, successive states of the new interpretation can share a layer, and be essentially recycled and stored in place. The in-place update for a modal dialog can be done in a number of ways; this is a corner case. Let's go back to normal cases, where we have a single new interpretation.

Dialog layer addition 1330 creates a new dialog layer with a time-stamp, and adds it to the front of the dialog history queue shown in FIG. 4, temporarily making it larger. The new interpretation is ready with an intent slot, other slot-value pairs that include query entities and response entities, and perhaps additional context variables. The new layer is populated and inserted by API calls. Next, the dialog history 400 (already editing by the addition of a new layer) is sent to layer pruning module 1320. The module will prune (i.e., remove from the dialog history) any layer that is 'too old,' which is to say that the time elapsed since the layer's creation date exceeds a set threshold, such as two minutes, or five minutes. This first pruning method may delete one or more of the oldest layers, or do nothing. In some embodiments, there are also size limits on the dialog history. In some embodiments, this limit is expressed as a maximum number of layers; in this case, a second stage of pruning will delete the oldest remaining layer, if the maximum capacity of the dialog history (as a count of layers) has been exceeded.

In other embodiments, the dialog history size limit is expressed as a storage capacity (in terms of, say, KB). The resulting state of the dialog history data structure will then be serialized for transmission to its destination.

FIG. 15 through FIG. 17 illustrate the dynamic behavior of interpretation data structures using various example dialogs. A user's query is shown in the first column. The second column is the initial interpretation of the query, obtained directly from the semantic parser. This initial interpretation may be complete or not; when incomplete, it is handed in turn to co-reference resolution and interpretation completion modules. The third column shows the complete or completed interpretation. The fourth column is the response given by the assistant to the user.

All these examples involve merging steps or co-reference resolution steps for each new query (each query other than the first one). Note that once a merge step has been taken and has created a merged interpretation, merging need not be repeated for every future use of that interpretation. This is because completed interpretations shown in the third column are stored in the dialog history, from which they will later be retrieved, whereas the interpretations in the second column are internal and temporary.

FIG. 15 illustrates a dialog, and notably, a merge operation used in interpretation completion. A query, 'What is the population of Japan?' is followed by 'How about China?'. The first query is mapped to the complete interpretation with a GEO_QUIZ intent (representing geographic information queries) with a WHAT slot that is a geographical attribute, and a WHERE slot that refers to Japan. The semantic grammar finds that the GEO_QUIZ interpretation is complete; it follows that an identical complete interpretation appears in the third column, and is added to the dialog history. In addition, entities for the country 'Japan' and the attribute 'population' are added to the query entities.

The query 'What about China' is missing attributes, notably its intent. According to one embodiment, a semantic parser is able to match an incomplete pattern, where 'How about' is followed by any geographical name; upon recognizing the geographical name, 'China,' the parser interprets 'How about' as a Place entity (say, Place_China) then builds an interpretation of the entire query where the intent is GEO_QUIZ and the WHERE slot is set to the entity Place_China. This interpretation is incomplete because the query does not ask any specific question about China; thus, there are missing attributes in the query interpretation. The semantic parser would also be able to find alternative interpretations for 'how about' in other domains. In each domain that provides an alternative interpretation, searching recent dialog layers In an alternative embodiment, where parts of speech are recognized during a partial bottom-up parse, 'China' could also be found to be a geographic entity (a Place) and be assigned to a WHERE slot. The missing intent causes a match with the previous interpretation. A merge occurs with the previous interpretation. The GEO_QUIZ intent and population attribute (WHAT) are copied from the previous interpretation, and the value of the WHERE slot changes from 'Japan' in the previous interpretation to 'China.'

In other embodiments that use precise grammars and tighter semantics, parsing and interpretation are responsible for identifying intents. In the context of multiple domains, there are a number of possible parses for 'How about China,' with corresponding interpretations and intents. The GEO_QUIZ intent is one of them. Suppose the assistant's domains also include online commerce for a site that sells wedding presents. In a parallel Bridal Gift domain, the query 'How about China' may have an incomplete interpretation as a search for a gift of china dishes. There may be multiple incomplete interpretations in different domains with different intents, or with the same intent. The pattern match for incomplete patterns looks in the dialog history for a recent intent that matches. Here, the Bridal Gift incomplete interpretation will fail, while the geography interpretation will succeed, due to the previous intent.

The phrase 'How about' matches an incomplete pattern and causes the semantic parser to look for context, using the dialog history to understand the query by completing its interpretation.

FIG. 16 depicts a subtler example that uses both dialog history and query entities. The second query matches an incomplete pattern. It lacks a value for the WHERE slot, which requires a Place. Interpreting the word 'there' in this query calls for what is known as co-reference resolution. The word 'there' specifically calls for a Place entity, and a match is made by the entity retrieval API with the query entity, Alexandria Va., from the first query. Note that using the response entity would also do the job in this case.

The third query uses the word 'ones' or the phrase 'show me the ones', which guides the semantic parser towards an incomplete pattern, one that involves a search among multiple previous answers. The semantic parser tries all domains that accept the pattern 'show me ones <WITH_PROPERTY>' but only the hotel search domain finds a match for the 'with air conditioning' requirement; had there been an automobile domain, the 'with air conditioning' requirement would match, but the previous answers 'the ones' which are found in the response entities would have to be automobiles and not hotels to create a match. Since, the interpretation is incomplete, it looks for a match in the dialog history, using response entities. The previous layer does not provide a match, due to its WEATHER_INFO intent. But the interpretation from the very first query (two layers back) fits the bill; it is a match. Next, a merge occurs between the previous query 'show me hotels in Alexandria Va.' which has the intended effect of narrowing the hotel search with an additional condition, stored in the FILTER slot of the HOTEL_SEARCH.

When searching for hotels, (with the HOTEL_SEARCH intent) a likely next step is to make a reservation; naturally, a reservation date is relevant; it will be held in a WHEN slot. The WHEN slot is unspecified in the first query, which would result in a default assignment of a date, such as perhaps 'Today' if the use of the date becomes required, but initially it isn't. The second query sets the WHEN Date to 'Sunday.' When the third query is parsed, the unassigned WHEN slot (in one embodiment) may be automatically completed by co-reference resolution with the date from the second query. This was a query entity from the second completed interpretation. The WHERE value of the second interpretation comes from the WHERE query entity of the first query's interpretation; and the WHERE value of the second interpretation comes from the WHERE query entity of the second query's interpretation, which is the same as the former one, but other things being equal, the most recent information takes precedence. It is worth noting that the third query benefits from the dialog history in two ways, from different interpretations in different domains.

FIG. 17 illustrates an example dialog where the respective roles of query entities and response entities can be distinguished clearly. In this case, comparing the number of query entities and the number of response entities helps to decide which of the lists should be used. The first query is in the mathematics domain; the intent is MATH, say. The first query is parsed and interpreted as a complete interpretation, which enters the dialog history. In addition, two query entities, as well as the operation between them, are added to the query entities. When the second query asks for 'their' product, this is an incomplete interpretation; the meaning of 'their' needs to be resolved by co-reference resolution. There is a response entity 'fifteen', and the preference for arithmetic fill-in would be to use the previous result (as does a calculator). However, 'their' calls for two or more numbers. Thus, the reference resolution algorithm searches for two or more quantities (from the same list) in the dialog history. In one embodiment, it finds a match with the previous interpretation, which has two quantities, resulting in a merge, even though the match is based on query entities. As a result, the second interpretation is completed, and it gets stored in the dialog history, with two numeric query entities and a single numeric response entity. In contrast with the previous behavior, the third query 'Now subtract five', which is the same as 'Subtract five', acts as a plain calculator, for which the next operation is based on the previous result (the 'accumulator'). Hence, the value five is subtracted from the QUANTITY response from the previous interpretation, and the answer, as expected, is: 'The difference between 26 and 5 is 21.'

Some of these examples illustrate the fact that a conversational agent allows users to modify a list of results repeatedly by filtering or redefining criteria. In a natural human dialog, users often do not know what they want at the beginning of the dialog; and even if they did, they could have trouble submitting all the relevant criteria in a single query. Dialog history allows the assistant to overcome these issues and give users a great experience.

In some embodiments, dialog context data for different users is stored on shared servers (or 'in the cloud'.) A lookup technique ensures that the processing of a user's query will use the correct dialog history data. In some embodiments, a unique session ID is used as an index, stored in a hash table or other associative memory structure, to access the dialog history. Such association may be used to retrieve dialog history data upon reception of a query. Such embodiments might have lower transmission costs, overall, but require the use of one or more servers.

In embodiments, the dialog history is stored on the specific user's client device. This simplifies the server's task when processing queries, since every user query 300 is received packaged with its associated query context 420. In some embodiments, dialog history 400 is serialized and sent to the corresponding client. The client stores serialized updated dialog context 450, and later sends the same data back, along with a new user query 300, as the dialog history 400 component of query context 420. A variety of data representations are possible. Some such embodiments have a greater cost in terms of serialization, deserialization, and transmission time. However, a major benefit of such embodiments is that the NLU system avoids data management bottlenecks, and many possible issues of falling out of sync between data that should be closely associated, namely, user query 300, request info 410, and dialog history 400.

Figure 18:
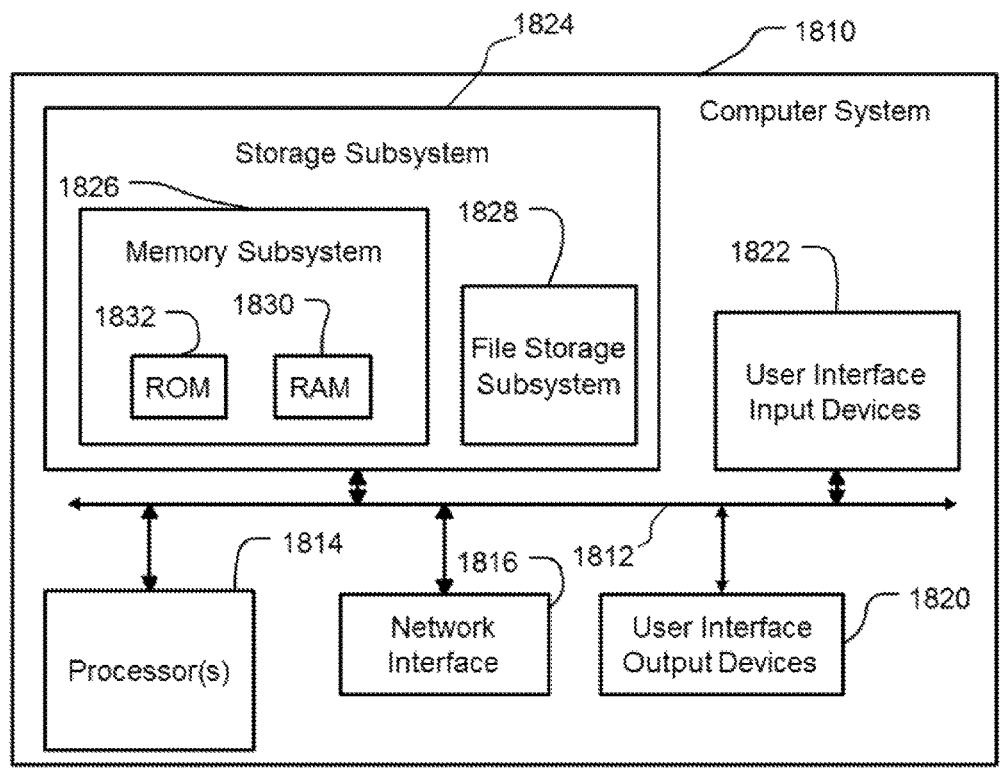
FIG. 18 is a block diagram of an example computer system.

FIG. 18 is a block diagram of an example computer system. A computer system 1810 typically includes at least one processor 1814, which communicates with a number of peripheral devices via a bus subsystem 1812. These peripheral devices may include a storage subsystem 1824, comprising for example memory devices and a file storage subsystem, user interface input devices 1822, user interface output devices 1820, and a network interface subsystem 1816. The input and output devices allow user interaction with the computer system 1810. A network interface subsystem 1816 provides an interface to outside networks, including an interface to a communication network 125, and is coupled via the communication network 125 to corresponding interface devices in other computer systems.

User interface input devices 1822 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into a computer system 1810 or onto a communication network 125.

User interface output devices 1820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1810 to the user or to another machine or computer system.

The storage subsystem 1824 stores programming and data constructs that provide the functionality of some or all of the modules described herein, including the logic to create inferred queries for use as query suggestions according to the processes described herein. These software modules are generally executed by a processor 1814 alone or in combination with other processors.

Memory 1826 used in the storage subsystem can include a number of memories including a main random access memory (RAM) 1830 for storage of instructions and data during program execution and a read only memory (ROM) 1832 in which fixed instructions are stored. A file storage subsystem 1828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by the file storage subsystem 1828 in the storage subsystem 1824, or in other machines accessible by the processor.

Bus subsystem 1812 provides a mechanism for letting the various components and subsystems of the computer system 1810 communicate with each other as intended. Although bus subsystem 1812 is shown schematically as a single bus, alternative embodiments of the bus subsystem may use multiple busses.

The computer system 1810 can be of varying types including a workstation, server, computing cluster, blade server, server farm, or any other data processing system or computing device. Due to the ever-changing nature of computers and networks, the description of the computer system 1810 depicted in FIG. 18 is intended only as an example for purposes of illustrating the preferred embodiments. Many other configurations of computer system 1810 are possible having more or fewer components than the computer system depicted in FIG. 18.

Figure 19A:
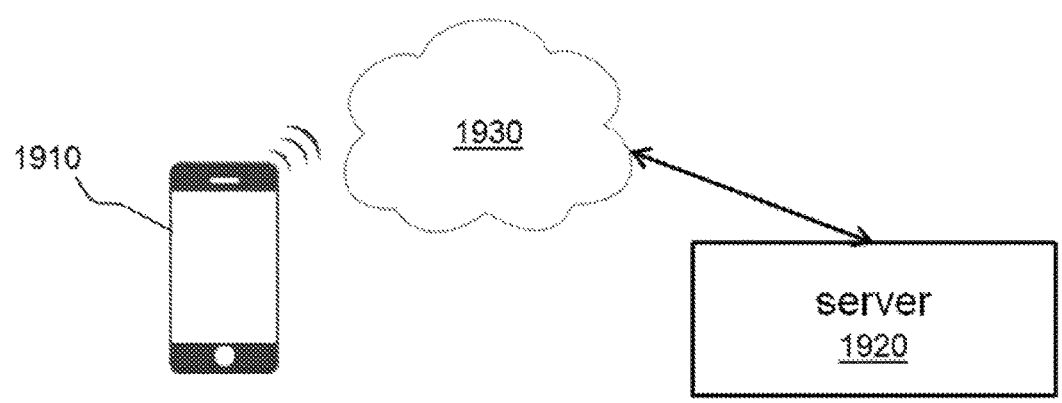
FIG. 19A illustrates a user device comprising a mobile phone in communication with a server computing system through a network cloud, according to an embodiment of the invention.

FIG. 19A illustrates a user device comprising a mobile phone in communication with a server computing system through a network cloud, according to an embodiment of the invention. Mobile phone 1910 captures audio and transmits it through cloud 1930 to server 1920. The mobile phone 1910 may host client 500. In an embodiment, the client on mobile phone 1910 may store dialog context received from the server in the phone's memory and provide the entire context to the server along with each user query. In an alternate embodiment, the server may store the dialog context information in association with the user for use with the user's subsequent query. Server 1920 has a processor on which it runs a computer program for natural language processing. The server uses audio information received from mobile phone 1910 to recognize speech and interpret it, using the dialog context information to complete incomplete interpretations. Mobile phone 1910 is one kind of portable devices. Some other examples of portable devices are tablets, laptop computers, health monitors, medical aid devices, and wearable devices such as smart watches and clothing.

Figure 19B:
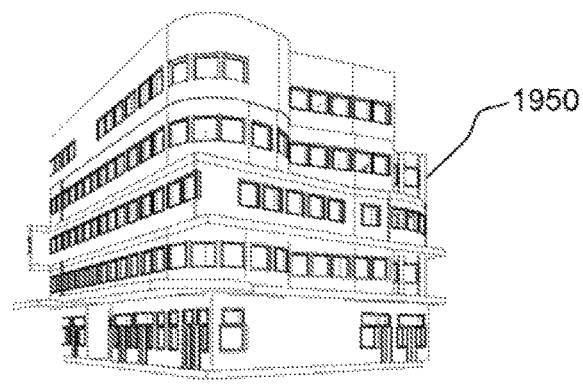
FIG. 19B illustrates an integrated user device housed in an apartment building, according to an embodiment of the invention.

FIG. 19B illustrates an integrated user device housed in an apartment building, according to an embodiment of the invention. The apartment building houses a computing system in communication with at least one microphone. The microphones capture audio and transmit it to the computing system that hosts client 500 and NLU system 600. The computing system has a processor on which it runs a computer program for natural language processing. The program stores dialog context information in the computing system. It uses audio information from the microphones to recognize speech and interpret it, using the stored dialog context information to complete incomplete interpretations. An apartment building is one kind of building that can embody the invention. Some other examples of buildings are houses, offices, factories, hotels, museums, shopping malls, airports, subway stations, kiosks, and statues.

Figure 19C:
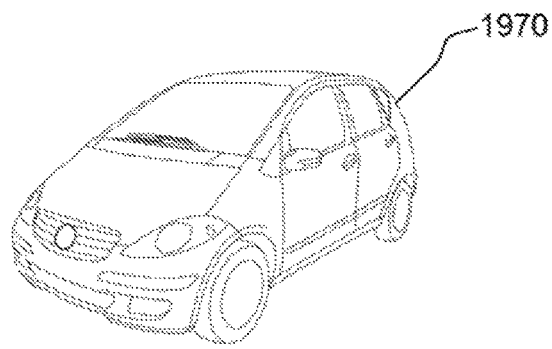
FIG. 19C illustrates an integrated user device housed within in a car, according to an embodiment of the invention.

FIG. 19C illustrates an integrated user device housed within in a car, according to an embodiment of the invention. The car is a vehicle that comprises a processor on which it runs a computer program for natural language processing. The program stores dialog context information in a local memory. It uses audio information from occupants to recognize speech and interpret it, using the stored dialog context information to complete incomplete interpretations. Some other types of vehicles that can embody the invention are trucks, airplanes, trains, ships, spaceships, and elevators.

What is claimed is:

1. A method of disambiguating interpretations, the method comprising:
   receiving from a client a natural language query and an associated dialog history, the natural language query having an incomplete interpretation, the incomplete interpretation having at least one slot name whose value is ambiguous, the associated dialog history including one or more entries for history items, each history item including a previous interpretation and being associated with a named slot from the set comprising WHO, WHAT, WHEN, WHERE and HOW MANY, and each history item entry being associated with a slot value, saliency weight and sequence number;
   selecting, from the associated dialog history, a history item including a previous interpretation, the history item being selected, from the associated dialog history, based on the slot name of the history item, the number sequence of the history item and the saliency weight of the history item, such that the selected history item matches the natural language query having the incomplete interpretation for purposes of completing the at least one slot name whose value is ambiguous;
   merging the previous interpretation of the selected history item with the incomplete interpretation to form a merged interpretation;
   creating an updated dialog history by adding, to the associated dialog history, a new dialog history layer comprising the merged interpretation and at least one additional history item having a slot name, a slot value, a saliency weight, and a new sequence number; and
   sending the updated dialog history to the client.

2. The method of claim 1 wherein at least one of the history items of the associated dialog history stores a variable-length array of values.

3. The method of claim 1 wherein the set is open-ended, the method further comprises creating a new history item within the new dialog history layer, and the new history item has a new slot name.

4. The method of claim 1 wherein:
   the natural language query received from the client is a stream of data and the associated dialog history is received at a beginning of the natural language query; and
   the updated dialog history sent to the client is part of structured output.

5. The method of claim 1, wherein the matching history item is selected by (i) comparing the slot name of each history item with the at least one slot name whose value is ambiguous, (ii) considering the saliency weight for each history item, where the saliency weight indicates an importance of each respective history item in the associated dialog history and (iii) considering the sequence number of each history item, where the sequence number indicates a time sequence in which each respective history item has been placed in the associated dialog history.

6. The method of claim 5, wherein the matching history item is selected by (i) identifying one or more history items, from the associated dialog history, having a slot name that matches the at least one slot name whose value is ambiguous and (ii) selecting, as the selected matching history item, one of the identified one or more history items based on the saliency weights and the sequence numbers of the identified one or more history items.

7. A non-transitory computer-readable recording medium having computer program instructions recorded thereon, the computer program instructions, when executed on a computer processor, causing the computer processor to perform a method of disambiguating interpretations, the method comprising:
   receiving from a client a natural language query and an associated dialog history, the natural language query having an incomplete interpretation, the incomplete interpretation having at least one slot name whose value is ambiguous, the associated dialog history including one or more entries for history items, each history item including a previous interpretation and being associated with a named slot from the set comprising WHO, WHAT, WHEN, WHERE and HOW MANY, and each history item entry being associated with a slot value, saliency weight and sequence number;

selecting, from the associated dialog history, a history item including a previous interpretation, the history item being selected, from the associated dialog history, based on the slot name of the history item, the number sequence of the history item and the saliency weight of the history item, such that the selected history item matches the natural language query having the incomplete interpretation for purposes of completing the at least one slot name whose value is ambiguous;

merging the previous interpretation of the selected history item with the incomplete interpretation to form a merged interpretation;

creating an updated dialog history by adding, to the associated dialog history, a new dialog history layer comprising the merged interpretation and at least one additional history item having a slot name, a slot value, a saliency weight, and a new sequence number; and sending the updated dialog history to the client.

8. The non-transitory computer-readable recording medium of claim 7, wherein the matching history item is selected by (i) comparing the slot name of each history item with the at least one slot name whose value is ambiguous, (ii) considering the saliency weight for each history item, where the saliency weight indicates an importance of each respective history item in the associated dialog history and (iii) considering the sequence number of each history item, where the sequence number indicates a time sequence in which each respective history item has been placed in the associated dialog history.

9. The non-transitory computer-readable recording medium of claim 8, wherein the matching history item is selected by (i) identifying one or more history items, from the associated dialog history, having a slot name that matches the at least one slot name whose value is ambiguous and (ii) selecting, as the selected matching history item, one of the identified one or more history items based on the saliency weights and the sequence numbers of the identified one or more history items.

10. A system including one or more processors coupled to memory, the memory loaded with computer program instructions for disambiguating interpretations, the computer program instructions, when executed on the processors, implement actions comprising receiving from a client a natural language query and an associated dialog history, the natural language query having an incomplete interpretation, the incomplete interpretation having at least one slot name whose value is ambiguous, the associated dialog history including one or more entries for history items, each history item including a previous interpretation and being associated with a named slot from the set comprising WHO, WHAT, WHEN, WHERE and HOW MANY, and each history item entry being associated with a slot value, saliency weight and sequence number;

selecting, from the associated dialog history, a history item including a previous interpretation, the history item being selected, from the associated dialog history, based on the slot name of the history item, the number sequence of the history item and the saliency weight of the history item, such that the selected history item matches the natural language query having the incomplete interpretation for purposes of completing the at least one slot name whose value is ambiguous;

merging the previous interpretation of the selected history item with the incomplete interpretation to form a merged interpretation;

creating an updated dialog history by adding, to the associated dialog history, a new dialog history layer comprising the merged interpretation and at least one additional history item having a slot name, a slot value, a saliency weight, and a new sequence number; and sending the updated dialog history to the client.

11. The system of claim 10, wherein the matching history item is selected by (i) comparing the slot name of each history item with the at least one slot name whose value is ambiguous, (ii) considering the saliency weight for each history item, where the saliency weight indicates an importance of each respective history item in the associated dialog history and (iii) considering the sequence number of each history item, where the sequence number indicates a time sequence in which each respective history item has been placed in the associated dialog history.

12. The system of claim 11, wherein the matching history item is selected by (i) identifying one or more history items, from the associated dialog history, having a slot name that matches the at least one slot name whose value is ambiguous and (ii) selecting, as the selected matching history item, one of the identified one or more history items based on the saliency weights and the sequence numbers of the identified one or more history items.

* * * * *